US012649203B2

(12) United States Patent
Belohlav et al.

(10) Patent No.: US 12,649,203 B2
(45) Date of Patent: Jun. 9, 2026

(54) BRAZE PRODUCT INCLUDING ADDITIVE PARTICLES AND METHODS OF BRAZING

(71) Applicant: Lucas-Milhaupt, LLC, Cudahy, WI (US)

(72) Inventors: Alan Belohlav, Oostburg, WI (US); Murtatha M. Jamel, Saint Francis, WI (US); David F. Trungale, Delafield, WI (US)

(73) Assignee: Lucas-Milhaupt, LLC, Cudahy, WI (US)

( * ) Notice: Subject to any disclaimer, the term of this patent is extended or adjusted under 35 U.S.C. 154(b) by 92 days.

(21) Appl. No.: 18/349,052

(22) Filed: Jul. 7, 2023

(65) Prior Publication Data

US 2025/0144750 A1 May 8, 2025

Related U.S. Application Data

(60) Provisional application No. 63/482,174, filed on Jan. 30, 2023, provisional application No. 63/359,638, filed on Jul. 8, 2022.

(51) Int. Cl.
 *B23K 35/00* (2006.01)
 *B23K 1/06* (2006.01)
 (Continued)

(52) U.S. Cl.
 CPC ............ *B23K 35/0244* (2013.01); *B23K 1/06* (2013.01); *B23K 1/19* (2013.01); *B23K 35/368* (2013.01); *B23K 35/406* (2013.01)

(58) Field of Classification Search
 CPC ........ B23K 35/0244; B23K 1/06; B23K 1/19; B23K 35/368; B23K 35/00–406; B23K 2035/408; B23K 35/406
 (Continued)

(56) References Cited

U.S. PATENT DOCUMENTS

| 5,232,788 A | 8/1993 | Timsit et al. |
| 5,573,602 A | 11/1996 | Banerji et al. |

(Continued)

FOREIGN PATENT DOCUMENTS

| AU | 2020100570 A4 | 5/2020 |
| CA | 2842762 A1 | 2/2013 |

(Continued)

OTHER PUBLICATIONS

PCT International Search Report and Written Opinion for International Application No. PCT/US2023/069823 filed on Jul. 7, 2023, Date of Mailing: Dec. 1, 2023, 19 pgs.

(Continued)

*Primary Examiner* — Kiley S Stoner
(74) *Attorney, Agent, or Firm* — Alix, Yale & Ristas, LLP

(57) ABSTRACT

Additive particles are introduced to a braze joint by combining the additive particles with a flux and using the flux with additive particles to form a core or coating of a braze product including braze alloy and flux. Additive particles are selected to provide some improvement to the finished braze joint that cannot be achieved by combining the additive particles directly into the braze alloy. Methods of brazing include application of vibration to a braze joint while the braze joint is maintained at a brazing temperature. Vibration applied to the materials being joined is transmitted through the flux, molten braze alloy and additive particles, producing a braze joint of increased strength and uniformity.

14 Claims, 14 Drawing Sheets

(51) Int. Cl.
  *B23K 1/19* (2006.01)
  *B23K 35/02* (2006.01)
  *B23K 35/368* (2006.01)
  *B23K 35/40* (2006.01)

(58) Field of Classification Search
  USPC ...................................... 228/245–255, 56.3
  See application file for complete search history.

(56) References Cited

U.S. PATENT DOCUMENTS

| | | | |
|---|---|---|---|
| 5,736,074 | A | 4/1998 | Hayes et al. |
| 5,781,846 | A | 7/1998 | Jossick |
| 6,317,913 | B1 | 11/2001 | Kilmer et al. |
| 6,613,123 | B2 | 9/2003 | Corbin et al. |
| 7,169,209 | B2 | 1/2007 | Nakata et al. |
| 7,800,230 | B2 | 9/2010 | Hirano et al. |
| 8,696,829 | B2 | 4/2014 | Schmitt et al. |
| 8,790,472 | B2 | 7/2014 | Ueshima et al. |
| 9,095,936 | B2 | 8/2015 | McIsaac et al. |
| 9,682,425 | B2 | 6/2017 | Xu et al. |
| 9,987,726 | B2 | 6/2018 | Olsen |
| 10,646,942 | B2 | 5/2020 | Charlas |
| 10,898,963 | B2 * | 1/2021 | Miyake ................ B23K 35/286 |
| 10,926,360 | B2 | 2/2021 | Arai et al. |
| 11,241,760 | B2 | 2/2022 | Yokoyama et al. |
| 2006/0124706 | A1 | 6/2006 | Raybould et al. |
| 2007/0029370 | A1 | 2/2007 | Zhao et al. |
| 2008/0237301 | A1 * | 10/2008 | Hirano ............... B23K 35/3618 |
| | | | 228/56.3 |
| 2009/0014092 | A1 | 1/2009 | Ueshima et al. |
| 2011/0123824 | A1 | 5/2011 | Belohlav et al. |
| 2015/0093282 | A1 * | 4/2015 | Bell .......................... B22F 1/18 |
| | | | 419/38 |
| 2023/0201976 | A1 | 6/2023 | Koga et al. |

FOREIGN PATENT DOCUMENTS

| | | | | | |
|---|---|---|---|---|---|
| CN | 1476953 | A | * | 2/2004 | ......... B23K 35/3053 |
| CN | 101966628 | A | | 2/2011 | |
| CN | 102784988 | A | | 11/2012 | |
| CN | 103769760 | A | | 5/2014 | |
| CN | 102935562 | B | | 3/2015 | |
| CN | 104759786 | A | * | 7/2015 | ......... B23K 35/3006 |
| CN | 105382439 | A | * | 3/2016 | ......... B23K 35/0227 |
| CN | 105562872 | A | | 5/2016 | |
| CN | 104972242 | B | | 4/2017 | |
| CN | 107433400 | A | * | 12/2017 | ......... B23K 35/0222 |
| CN | 108213768 | A | * | 6/2018 | |
| CN | 109093288 | A | * | 12/2018 | |
| CN | 109202331 | A | * | 1/2019 | |
| CN | 110711972 | A | * | 1/2020 | |
| CN | 110711973 | A | * | 1/2020 | |
| CN | 108326475 | B | * | 2/2020 | ............. B23K 35/40 |
| CN | 110883446 | A | * | 3/2020 | ......... B23K 35/3086 |
| CN | 110936064 | A | * | 3/2020 | |
| CN | 110936065 | A | * | 3/2020 | |
| CN | 111390316 | A | | 7/2020 | |
| CN | 112195055 | A | * | 1/2021 | ........ B23K 35/0227 |
| CN | 112958865 | A | | 6/2021 | |
| CN | 112958944 | A | * | 6/2021 | ........ B23K 35/0244 |
| CN | 114131236 | A | * | 3/2022 | |
| CN | 114473291 | A | * | 5/2022 | |
| DE | 112007001029 | B4 | * | 7/2014 | .......... B23K 35/262 |
| EP | 1769881 | B1 | | 4/2007 | |
| JP | H05185276 | A | | 7/1993 | |
| JP | H05329626 | A | | 12/1993 | |
| JP | 2002086264 | A | | 3/2002 | |
| JP | 2005205466 | A | | 8/2005 | |
| JP | 2013212524 | A | | 10/2013 | |
| JP | 7014991 | B1 | | 2/2022 | |
| KR | 100594169 | B1 | * | 6/2006 | |
| WO | 2006063134 | A2 | | 6/2006 | |
| WO | 2007032429 | A1 | | 3/2007 | |
| WO | WO-2024011246 | A1 | * | 1/2024 | ............... B23K 1/06 |

OTHER PUBLICATIONS

Sujan G.K., et al, "Effects of metallic nanoparticle doped flux on the interfacial intermetallic compounds between lead-free solder ball and copper substrate", Materials Characterization 97 (2014) pp. 199-209, Elsevier, 11 pgs.

Afolabi Oluwadara C., et al., "Analysis of melting behaviour during the equilibration stage of wide-gap brazing", The International Journal of Advanced Manufacturing Technology (2020) 110:2295-2304, https://doi.org/10.1007/s00170-020-05988-2, pp. 2295-2304, 10 pgs.

Hawk Cheryl, "Wide Gap Braze Repairs of Nickel Superalloy Gas Turbine Components", Date issued: 2016—Mines Theses & Dissertations, 172 pgs.

Yu Wei-Yuan, et al., "Interface reaction in ultrasonic vibration-assisted brazing of aluminum to graphite using Sn—Ag—Ti solder foil", ScienceDirect, Journal of Materials Processing Technology, vol. 221, Jul. 2015, pp. 285-290, https://doi.org/10.1016/j.jmatprotec.2015.02.028, 7 pgs.

Muhrat Abdulsalam, et al, "Ultrasonic-Assisted Brazing of Titanium Joints Using Al—Si Based Fillers: Numerical and Experimental Process Design", Metals, 2021, 11, 1686, https://doi.org/10.3390/met11111686, https://www.mdpi.com/journal/metals, 24 pgs.

Ogel B., et al., "Nickel Diffusion Coating on Austenitic Stainless Steels & Its Effect on Stress Corrosion Cracking", Apr. 1999, Plating & Surface Finishing, 4 pgs.

Cheng Zhun, et al., "Wide-Gap Brazing of K417G Alloy Assisted by In Situ Precipitation of M3B2 Boride Particles", Materials 2020, 13, 3140, doi: 10.3390/ma13143140, www.mdpi.com/journal/materials, 10 pgs.

Lyubimova T. P., et al., "Dynamics of an ensemble of spherical particles under translational vibrations of linear polarisation", Names'16, IOP Publishing, IOP Conf. Series: Journal of Physics: Conf. Series 879 (2017) 012025, doi :10.1088/1742-6596/879/1/012025, 6 pgs.

* cited by examiner

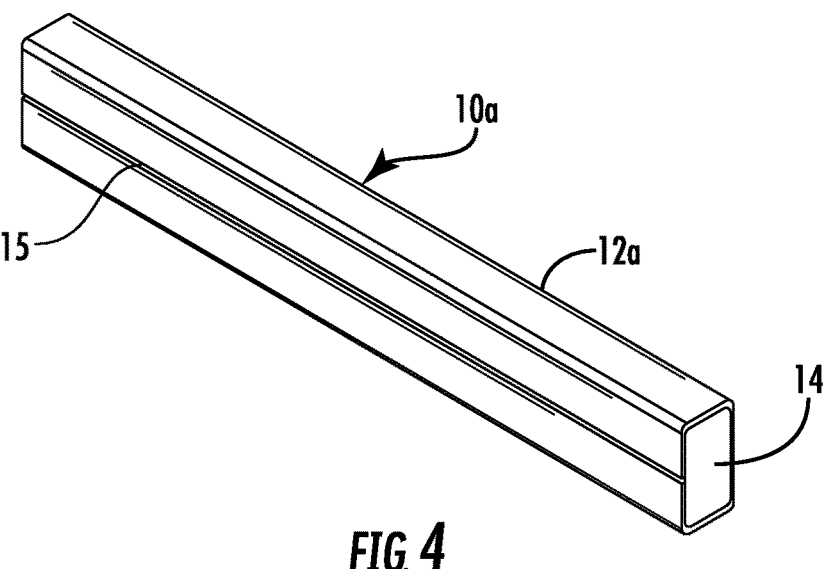
*FIG. 4*
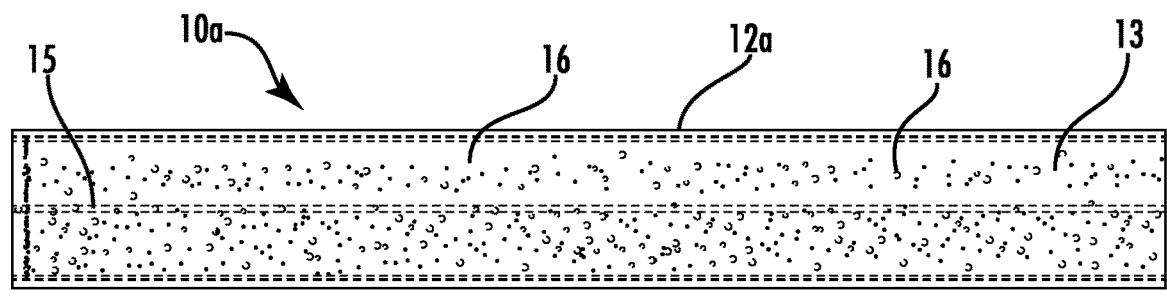
*FIG. 5*
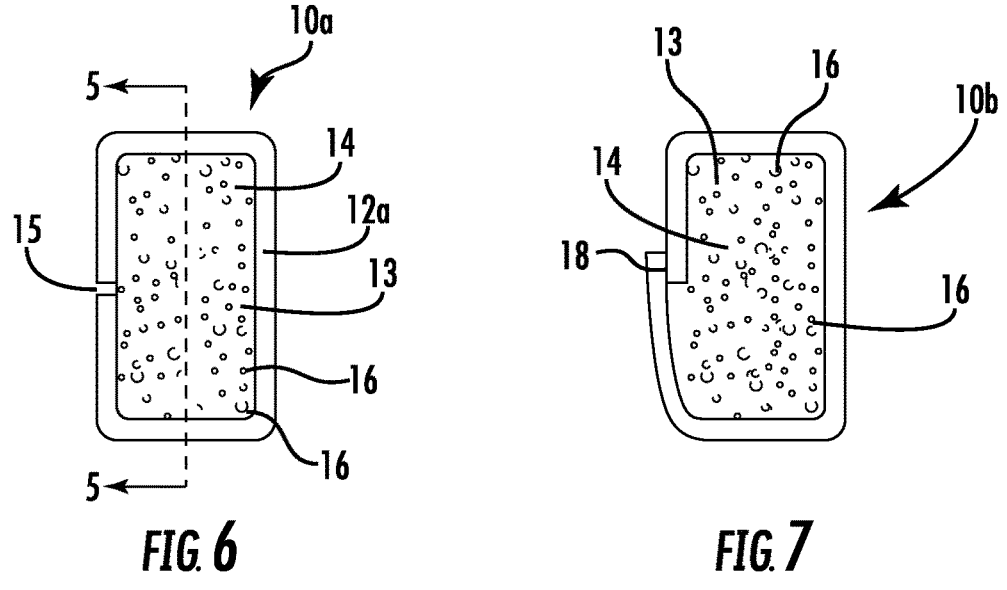
*FIG. 6*                    *FIG. 7*

SILVACUT I INTERFACE, 7000X CARBIDE LINE SCAN-1 2-6-23

SILVACUT I INTERFACE STEEL SIDE, 7000X 2-6-23

SILVACUT II CARBIDE SIDE, 5000X 2-6-23

X: 449 Y: 401
I: 36705

BRAZE PRODUCT INCLUDING ADDITIVE PARTICLES AND METHODS OF BRAZING

FIELD OF THE INVENTION

This invention relates to brazing materials and methods and more particularly to braze products comprising a braze filler metal and flux with finely divided additives. Methods of brazing using the disclosed braze products are also disclosed.

BACKGROUND

Brazing is a metal-joining process in which two base materials are joined together by melting and flowing a filler metal into a joint defined between the base materials, with the filler metal having a lower melting point than the base materials being joined. During the brazing process, the filler metal and the base materials are heated to a temperature above its melting (liquidus) temperature of the filler metal. Then, the molten filler metal flows into the gap between the base materials via capillary action. Fluxes are chemical compounds commonly used to prepare the surfaces of the materials in the joint by both removing oxidation and preventing additional high temperature oxidation that interferes with wetting of the faying surfaces by the molten filler metal. With the use of an appropriate flux, the molten filler metal wets the surfaces and when cooled is adhered to the adjoining surfaces to metallurgically bond the base material(s) together. A major advantage of brazing is the ability to create high strength joints between the same or different metals and metals with non-metallic materials.

In this disclosure, brazing product or braze product refers to a combination of braze alloy (also referred to as filler metal) and flux. Brazing products in the form of flux cored wire and rod are used to deliver braze filler metal and flux to a joint to be brazed. A wire or rod may define a channel or groove that is used to hold flux, or the filler metal may be in the form of a strip of braze alloy formed into a tube surrounding a core of flux. Brazing products in the form of flux coated rod, sheet, or preforms are also used to deliver braze filler metal and flux to a joint to be brazed. Braze products are configured to deliver a pre-determined quantity of flux to the joint along with sufficient filler metal to complete the joint. Another known form of braze product are braze pastes where powdered braze alloy and flux are combined with a liquid to form a braze paste that is applied to a braze joint. In any form of braze product, the flux removes oxidation on the surfaces to be joined, reduces the surface tension, and enhances wettability so the molten filler metal can wet and adhere to the faying surfaces of the parent materials forming a strong bond. In a properly designed braze joint, the surfaces to be joined are close enough to each other that melted filler metal is drawn into the joint by capillary action.

In some applications, metals are joined to metal ceramic hybrid materials such as tungsten carbide. Glasses and other materials can also be joined by brazing. To form a braze joint of high strength, it is critical that the surfaces to be joined are free of contaminants such as oxides that can interfere with wetting of the surface by the molten filler metal. During open air brazing, surfaces to be joined by are typically prepared by exposure to one or more fluxes that become molten upon heating. Brazing fluxes are chemical compounds such as fluorides, chlorides, boric acids, and alkalis. These compounds react to dissolve, absorb, or break up thin surface oxides that are formed as the parts are being heated.

Even when clean, materials such as tungsten carbide are resistant to wetting with molten filler metal. Proper wetting, meaning the molten filler metal freely flows and spreads over the substrate surfaces is critical to forming a strong braze joint. A wetted surface adheres strongly the filler metal to the parent material(s) when cooled, while a surface that is not wetted is only weakly joined to the filler metal, or not at all.

In some braze applications, one of the surfaces to be joined is physically moved when the filler metal is in a molten state (at brazing temperature) to promote wetting of the surface by the molten filler metal. Moving materials when they are extremely hot is dangerous and difficult to do in a consistent way. It will be recognized that part to part consistency is an important requirement in a manufacturing process such as brazing, and manual processes that produce inconsistent results or that require high skill are undesirable.

Temperature is another important factor in brazing. The filler metal must have a melting point below the temperature at which the parent material begins to melt or is otherwise thermally damaged. Because of this, filler metals with different melting temperatures have been developed for joining different combinations of materials. It is known that combining elements in different proportions, commonly referred to as alloying, results in filler metals having different melting temperatures, but that alloy formulations that lower melting temperatures can introduce undesirable attributes in the filler metal and/or the joint, for example, brittleness from the addition of tin. Filler metal formulations can therefore be a compromise because addition of a material such as nickel that would add strength to the filler metal would unacceptably increase the melting temperature of the filler metal. Elevated temperatures can degrade or negatively affect the materials to be joined even if the temperature is below a melting temperature of the materials to be joined, so filler metals and braze methods are used that do not exceed a predetermined temperature and that minimize the time for which the maximum temperature is maintained.

Some braze joints have gaps that are non-uniform or exceed the dimensions that will draw molten filler metal into the joint. Such joints may be found in repair or refurbishing of used parts that have worn, cracked, or been distorted by stress during use.

An object of the disclosure is to provide braze materials that form braze joints of high strength and durability in circumstances where the configuration of the braze joint is not ideal.

There is a need for brazing methods that improve the consistency of braze joints, while minimizing the time and skill required to form the braze joint.

There is a need in the art for brazing materials that produce high strength braze joints at predetermined braze temperatures selected to preserve the integrity of the materials to be joined.

SUMMARY OF THE INVENTION

According to aspects of the disclosure, a wire, rod, sheet, or preform for brazing includes a braze filler metal formed into a body of the wire, rod, sheet, or preform and has a flux-containing channel, cavity, core, or a coating of flux. The braze filler metal has a first melting temperature and the brazing flux in the channel, cavity, core, or coating has a second melting temperature lower than the melting temperature of the braze filler metal. According to aspects of the disclosure, metal or composite additive particles are evenly distributed in the brazing flux. The metal or composite additive particles are wettable by the melted braze filler metal and/or soluble in the melted braze filler metal. If the additive particles are metal or metal alloy particles, the metal or metal alloy particles have a third melting temperature higher or lower than the first melting temperature of the braze filler metal. The metal or composite particles have a particle size between 1 and 200 microns and are present in a proportion of between 0.5% and 30% of the braze filler metal by weight. One preferred proportion of metal or composite particles to total weight of flux and particles is 4-6 weight percent. The metal or composite particles are released from the channel, cavity, core, or coating when the brazing flux is melted at the second melting temperature and the metal or composite particles are capable of coalescing with the braze filler metal when the braze filler metal has melted at the second (flux) melting temperature.

The additive particles are selected to modify one or more attributes of the finished braze joint. The attributes may include, but are not limited to, grain size, grain morphology, phase morphology, promotion or suppression of discrete phases and intermetallic alloys, distribution of solid phases in the braze joint, wetting of base materials in the braze joint, increases in mechanical strength of the joint, resistance to crack initiation and propagation, modification of an interface layer with the materials being joined, toughness, hardness, or abrasion resistance of the solidified braze alloy. Combining the additive particles with the flux prevents any interaction of the additive particles and the braze alloy until the flux is in the molten (active) state. The additive particles are cleaned by the flux as it melts and flows into the braze joint, so any oxides are removed before the additive particles encounter molten braze alloy or surfaces of the materials to be joined, which are cleaned concurrently with the additive particles. Any interaction between the additive particles and the filler metal or surfaces to be joined occurs after the braze product is heated to a temperature that melts the flux.

The particles may be metals or metal alloys. Pure metals may be selected for their solid solubility or their ability to form desirable phases with other materials present in the braze alloy and/or in the materials to be joined. For example, pure elements that exhibit varying degrees of solid solubility with Fe-based (steel) and Cu-based alloys include Mn, Cr, V, Ti, Sc, Ni, Zn, Ga, Ge, Pd, Ag, In, Sn, and Sb. Complete solid solubility is present in the binary systems: Cr—Fe, Cr—V, Cu—Ni, and Cu—Pd. Solid solubility is associated with atomic diffusion potential. Additional elements that could be beneficial are Na and Ca.

Coated or composite particles are also potentially useful in the disclosed braze products as additive particles blended with flux. These could be one metal coated with another that both diffuse into the braze alloy by dissolution. Alternatively, particles with an outer layer that dissolves and an inner layer that remains intact and acts as a strengthener, which may be referred to as dispersion strengthening. Examples of complete dissolution couples would be a pure element and an alloy of the pure element (pure Ni coated with a Ni-based alloy or vice versa) or pure element coating another pure element (Co or Cu coating a Ni particle) or an alloy of one of the pure elements. An example of a non-dissolved strengthening particle would be a carbon, alloy, or stainless steel particle coated with Cu, Ni, etc.

According to aspects of the disclosure, the brazing flux and metal or composite particles are combined by blending additive powders with flux powder, adding a liquid carrier to the braze flux to form a paste which is blended to form a substantially homogeneous mixture, which is then dried and ground to form a powdered mixture of flux and additive particles that is used to fill a cavity, core or channel defined by a body formed of braze material such as a braze filler metal. The additive particles are encapsulated in the flux by this method and protected from oxidation before the braze product is used. In an alternative form, the braze filler metal takes the form of a rod or sheet and the powdered mixture of flux and additive particles are used to coat the rod or sheet. The combination of braze filler metal and flux containing additive particles are a braze product for forming a braze joint that introduces pre-determined proportions of braze filler metal, flux, and additive particles into a braze joint. The additive particles are selected in for material properties such as wettability in the molten braze filler metal, solubility in the molten braze metal, and/or melting temperature. The additive particles are delivered to a braze joint along with the molten flux followed by the molten braze filler metal and are integrated into the finished braze joint. The additive particles can serve several functions that improve the formation of the braze joint and/or improve the properties of the finished braze joint. One example is particles of a size range that are selected to fill wide joint gaps. The additive particles effectively create capillary paths between one another and the faying surfaces and facilitate movement of molten braze filler metal into and through the braze joint. Another example are metal or metal alloy particles of a size range selected to at least partially dissolve into the molten braze filler metal and improve some property of the finished braze joint, such as tensile strength or abrasion resistance.

The disclosed wire, rod, or sheet with flux containing additive particles can be used as a braze product or can be used to create a braze preform configured to position a predetermined quantity of braze filler metal, flux and additive particles in a braze joint. The braze joint is then heated through the melting point of the flux and braze filler metal to clean the joint and release the molten braze filler metal and additive particles into the braze joint. The additive particles are wet by the molten braze filler metal and, if soluble in the molten braze filler metal, will at least partially dissolve in the molten braze filler metal. When the braze joint is cooled, the additive particles are integrated into the finished braze joint.

A disclosed method of forming a braze joint may include selecting a filler metal to join two structures, said filler metal having a first melting point. Selecting one or more additive particles wettable and/or soluble in the filler metal when the filler metal has melted during a braze cycle. Positioning the filler metal and additive particles between the structures to be joined, and heating the structures, braze alloy and additive particles to melt the filler metal, wet and/or at least partially dissolve the additive particles to incorporate the additive particles into the braze joint. The method of forming a braze joint may include selecting metal or metal alloy particles in one or more size ranges to control melting or dissolution of the additive particles during the step of heating the structures.

Methods of brazing using the disclosed braze products include the application of vibration to the braze joint while the molten braze alloy, flux and additive particles are present in the braze joint. Vibration is most beneficial when applied to the less massive of the two parts being joined, which will induce motion of the less massive part relative to the more massive part. In addition to cyclic movement of one part relative to the other, vibration will significantly increase the kinetic energy in the materials present in the joint between the two base materials. Vibration applied to a braze joint while the molten filler metal, flux and particles are present in the joint at a predetermined braze temperature can promote formation of improved braze joints in several ways. Vibration may assist in the chemical action of the flux to remove oxides from the base materials being joined and from the surface of the metal or metal alloy particles. Removal and breaking up of oxides allows for intimate contact and wetting of the surfaces of the base materials being joined and the metal or metal alloy particles by the molten filler metal. Vibration enhances the alloying action into the filler and the interaction with the parent materials. Also, vibration homogenizes the materials within the braze joint and promotes even distribution of the particle nucleation sites and formation of smaller grains to create a more refined grain structure. Homogenization of the materials within the braze joint is significant when a combination of molten filler metal and metal or metal alloy particles having a higher melting point are present in the braze joint, as homogenous distribution of the metal or metal alloy particles within the molten filler metal within the braze joint will make the resulting braze joint more uniform and consistent. The metal or metal alloy particles within the braze joint may function mechanically to fill gaps in the braze joint or to improve the uniformity of spacing between the surfaces of the materials being joined. The metal or metal alloy particles, in combination with the braze alloy, may produce a braze joint having a depth or thickness greater than a braze joint formed without the metal or metal alloy particles. In this improvement, the metal or metal alloy particles act as "spacers" to hold the surfaces of the base materials being joined apart in a manner the molten filler metal is incapable of doing. Finally, the metal or metal alloy particles dissolve into the molten filler metal and alter the properties of the finished braze joint by, for example, increasing the strength, toughness and/or wear resistance of the finished braze joint without appreciably increasing the brazing temperature. Vibration may accelerate dissolution of the metal or metal alloy particles within the molten braze material so the resulting improvements in the finished braze joint are enhanced.

Experimental results demonstrate that the combination of a braze product incorporating metal particles in flux positions the metal particles at the interface surfaces, i.e., the surfaces of the materials being joined that are coated with the molten braze alloy during brazing. In this position, the metal particles influence the development of intermetallic phases at the surface of the materials being joined, which has a measurable effect on the strength of the brazed joint. In a braze product incorporating pure nickel particles, the braze joint includes substantially continuous and massive nickel-rich layers at the interface surfaces with the materials being joined. Analysis of these layers of intermetallic compounds shows they are rich in nickel and show diffusion of nickel into the surfaces of both materials being joined. Comparison braze joints prepared under the same braze parameters (temperature, time, materials joined, joint configuration, and vibration) with a braze product using the same braze alloy and flux but without the addition of nickel particles show a less continuous and less massive layer of intermetallic compounds at the interface and less diffusion between the braze alloy and the materials being joined. Application of vibration to the braze joint during brazing significantly improves some measures of joint strength when compared to the same braze product used under the same braze conditions. Evidence shows that vibration applied during brazing improves the morphology (microstructure) of the braze alloy, wetting of the materials being joined, reduced porosity in the braze joint, reduced incidence of flux inclusions, and improved braze alloy flow. Energy added to the braze joint through application of vibration during brazing may enhance diffusion between the braze alloy and materials being joined. Enhanced diffusion between braze alloy and materials being joined is generally associated with enhanced adhesion between the braze alloy and the surfaces of the materials being joined.

BRIEF DESCRIPTION OF THE DRAWINGS

FIG. 4 is a perspective view of an embodiment of a braze product having a generally rectangular cross-sectional shape and incorporating flux with additive particles according to aspects of the disclosure;
FIG. 5 shows a longitudinal sectional view through the braze product of FIG. 4, taken along line 5-5 of FIG. 6;
FIG. 6 is a cross sectional view of the braze product of FIG. 4;
FIG. 7 is a cross sectional view through an alternative braze product having a generally rectangular cross-sectional shape and incorporating additive particles in the flux according to aspects of the disclosure.

DETAILED DESCRIPTION

FIGS. 1-15 illustrate embodiments of braze products incorporating braze alloy and flux containing additive par-ticles according to the disclosure. By integrating the braze alloy with the flux containing additive particles, the flux, additive particles, and braze material can be introduced to a braze joint by positioning the braze product in or near the braze joint, rather than separately. The braze products have a consistent cross-sectional configuration and a known quan-tity of braze alloy, flux and additive particles per unit length or area. The quantity of braze alloy and flux are selected to provide sufficient braze alloy to fill a joint to be brazed and sufficient flux of a type that will ensure the surfaces of the joint are cleaned before the braze alloy is melted and flows into the joint. As is known in the art, the flux is selected to have a melting point lower than the braze material, so the flux melts, flows and cleans the joint before the braze alloy melts and flows to fill the joint. The additive particles are selected by size and material and mixed with the flux, resulting in a braze product having a pre-determined ratio of braze material, flux, and additive particles by weight. The braze alloy can be provided in several forms, depending on the way in which the braze product will be used, or the type of joint being brazed. In this application, "braze alloy" and "filler metal" are used interchangeably to refer to blends of metals having a predetermined melting or liquidus tempera-ture used to form a braze joint as is known in the art. The constituent metals forming braze alloys are selected for compatibility with each other, compatibility with the mate-rials being joined, and a melt temperature when combined that will not damage the materials being joined. For example, silicon and copper may be added to aluminum to form a braze alloy with a melting temperature below that of aluminum materials to be joined.

Figure 1:
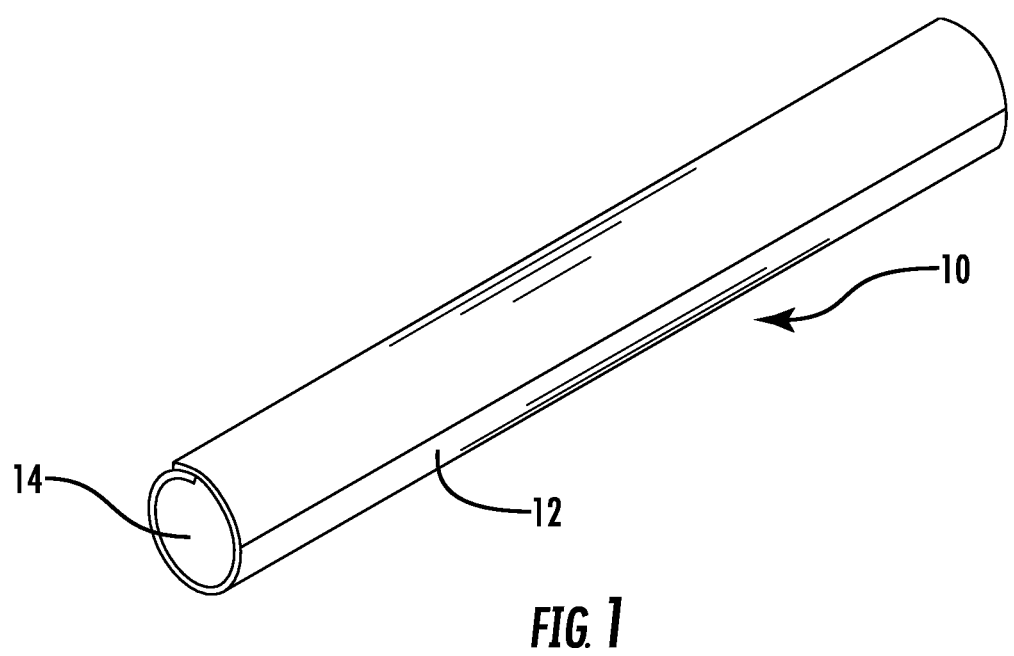
FIG. 1 is a perspective front view of an embodiment of a braze product with a generally cylindrical cross-sectional shape incorporating flux with additive particles according to aspects of the disclosure.
Figure 2:
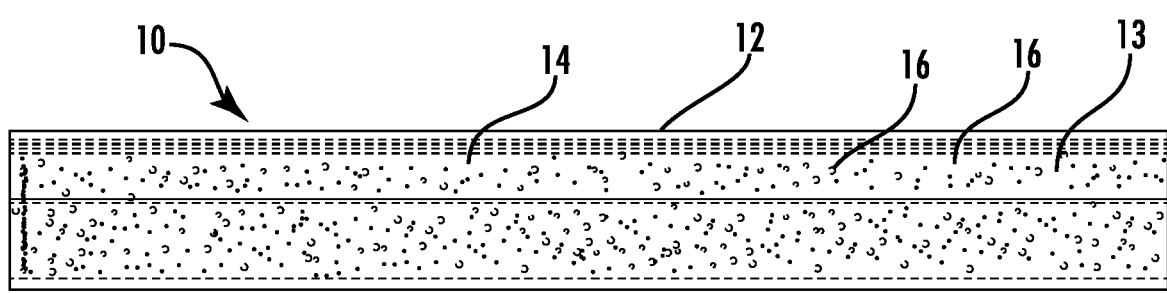
FIG. 2 shows a longitudinal sectional view through the brazing product of FIG. 1, taken along line 2-2 of FIG. 3.
Figure 3:
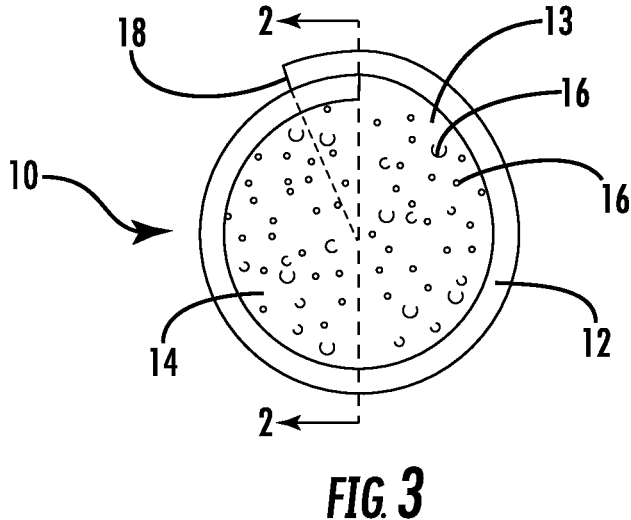
FIG. 3 is a cross sectional view of the braze product of FIG. 1.

In one embodiment of a braze product shown in FIGS. 1-3, a brazing wire or rod 10 has a sheath or body 12 of filler metal and a core 14 including flux 13 and additive particles 16 according to aspects of the disclosure. The thickness of the strip of braze alloy from which the body 12 is formed is selected so that the braze alloy melts when exposed to a pre-determined braze temperature for a pre-determined period and so the correct volume of filler metal is introduced to a braze joint. The strip is formed into a trough and filled with a flux 13 containing additive particles 16. The strip is then formed into a cylindrical shape to enclose and contain the flux 13 and additive particles 16. In the flux cored braze product embodiment 10 of FIGS. 1-3, the sheath 12 of braze alloy surrounds a core 14 of flux 13 with additive particles 16, with an overlap 18 between the longitudinal edges of the sheath 12 forming a path for flux to flow out of the core 14 when the braze product 10 is heated. It is also possible to form a sheath of braze material where the longitudinal edges meet to form a butt joint. The butt joint may be left unattached, or the longitudinal edges may be joined by laser welding (or other joining method) to form a seamless tubular sheath of braze alloy surrounding a core of flux with additive particles. In all the described braze product configurations, the word "adjacent" is used to describe the relationship between the longitudinal edges of the strip of braze alloy and is intended to encompass embodiments where the longitu-dinal edges overlap, are in contact, joined, or are slightly separated from each other as shown in the embodiment of FIGS. 1-7.

In the embodiment of FIGS. 1-3, the longitudinal edges of the strip overlap at least one degree of the circumference of the braze product 10. Depending upon the intended use of the braze product, the degree of overlap may be greater than one degree. A greater overlap can be used to increase the quantity of filler metal per unit length of the braze product relative to the mass of the flux and additive particles contained within the braze product. The "core" 14 of the braze product 10 includes flux 13 chosen to be compatible with the materials being joined and the additive particles 16. Flux compatibility relates to a melting temperature of the flux and a chemical composition effective to remove oxides from the materials being joined and the additive particles 16. The flux is formulated to have a melting temperature below that of the braze alloy, so the flux flows into the braze joint before the braze alloy. In the disclosed braze products, the additive particles are mixed with the flux and are delivered into the braze joint along with the flux, followed by the molten braze alloy.

FIGS. 4-6 illustrate a braze product 10*a* in the form of a rod having a rectangular cross section. The braze alloy is formed into a strip and shaped to form a rectangular channel that is filled with a mixture of flux 13 and additive particles 16. The strip is then shaped into a rectangular body 12*a* to surround the core 14 of flux 13 and additive particles 16. As shown in FIGS. 4 and 6, the longitudinal edges of the strip of braze alloy do not meet, defining a narrow opening 15 along the length of the braze product 10*a*. Such a narrow opening 15 allows the flux 13 and additive particles 16 to be effectively contained in the braze product 10*a* during pack- aging, storage, and transport, but allow the flux 13 and additive particles 16 to be released through the longitudinal opening 15 when the braze product 10*a* is heated. FIG. 7 illustrates a braze product 10*b* having a rectangular cross section where the longitudinal edges overlap to provide more secure containment of the flux 13 and additive par- ticles 16. The braze products 10*a*, 10*b* illustrated in FIGS. 4-7 are preferred forms of the disclosed braze product when a pre-placed wire form is required, such as a preformed wire ring, prior to heating. The defined location of the seam or gap between the longitudinal edges of the body of braze alloy can be positioned to release flux and additive particles toward the interior of a braze joint. For example, such a braze product configuration may be used to make a ring preform for placement in a circular braze joint, where the opening can be oriented to release flux and additive particles in a predetermined direction.

Figure 8:
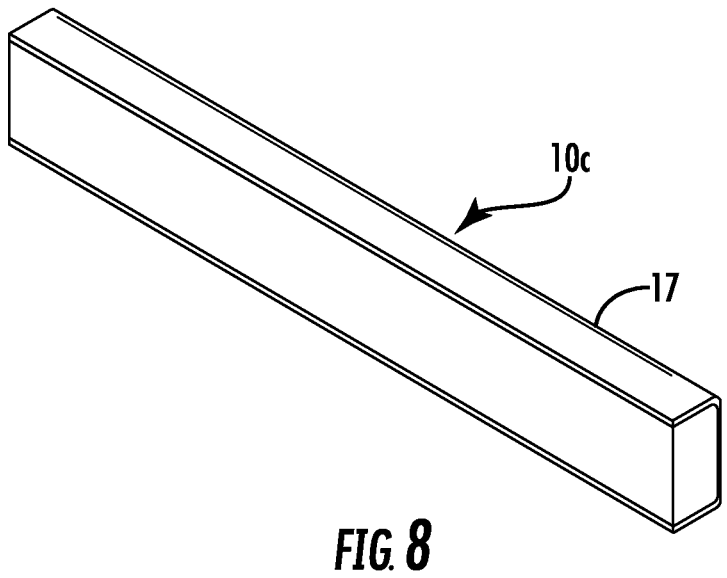
FIG. 8 is a perspective front view of an embodiment of a braze product with braze alloy in a rectangular cross section defining a channel containing flux with additive particles according to aspects of the disclosure.
Figure 9:
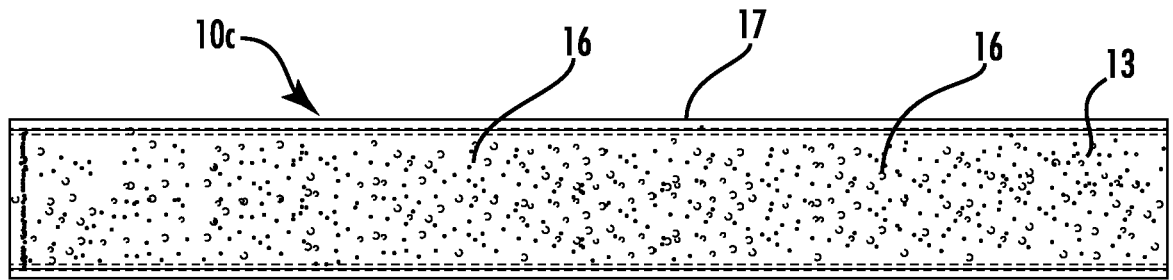
FIG. 9 shows a longitudinal sectional view through the braze product of FIG. 8, taken along line 9-9 of FIG. 10.
Figure 10:
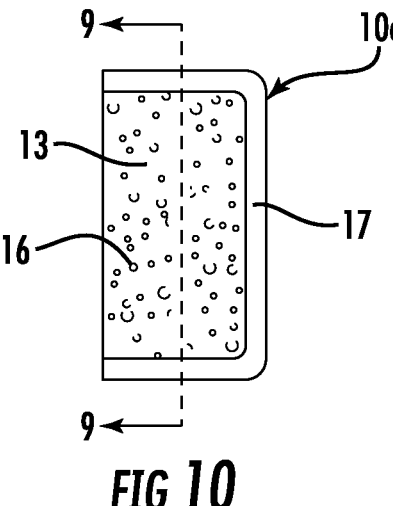
FIG. 10 is a cross sectional view of the braze product of FIG. 8.

FIGS. 8-10 illustrate a braze product 10*c* where a strip of braze alloy is formed into a channel 17 that is filled with flux 13 and additive particles 16. Binder may be combined with the flux 13 and additive particles 16 to help retain the flux mixture in the open channel 17. The binder may be com- posed of an adhesive resin and non-volatile organic com- pound (VOC) solvent carrier as is known in the art. The flux 13 with additive particles 16 may be combined with a binder and applied to the channel 17 in a paste or liquid form and dried in place to ensure adhesion between the flux and braze material.

Figure 11:
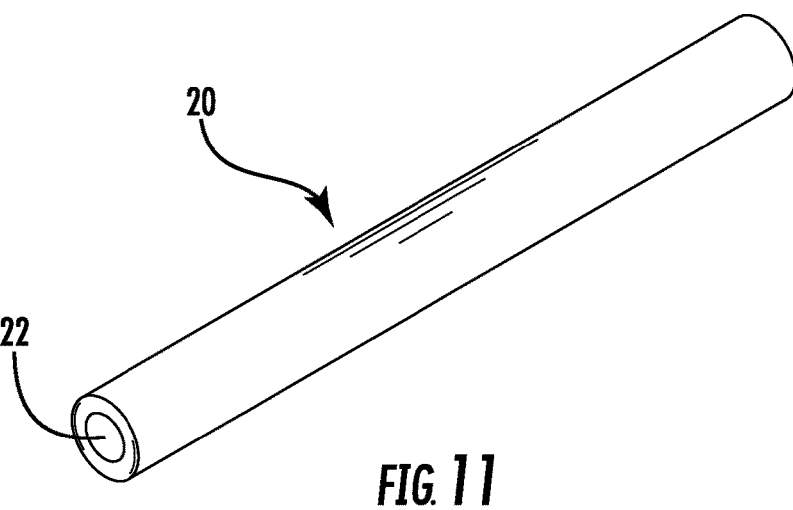
FIG. 11 is a perspective view of a portion of a braze product in the form of a wire or rod coated with flux with additive particles according to aspects of the disclosure.
Figure 12:
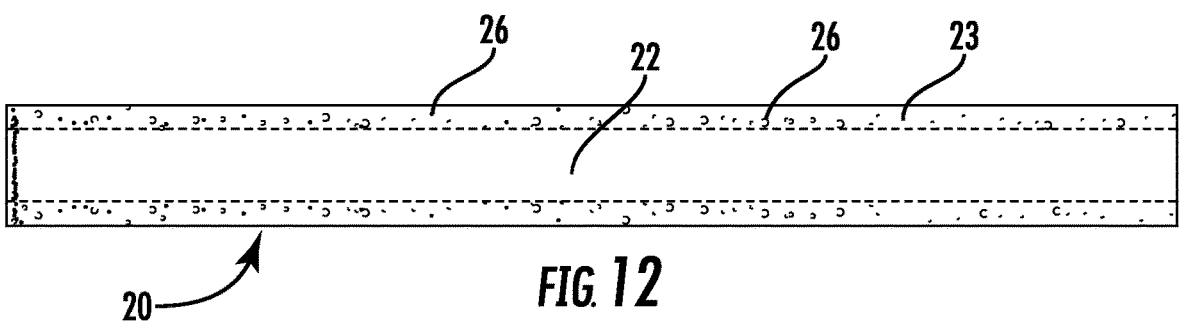
FIG. 12 shows a longitudinal sectional view through the braze product of FIG. 11, taken along line 11-11 of FIG. 13.
Figure 13:
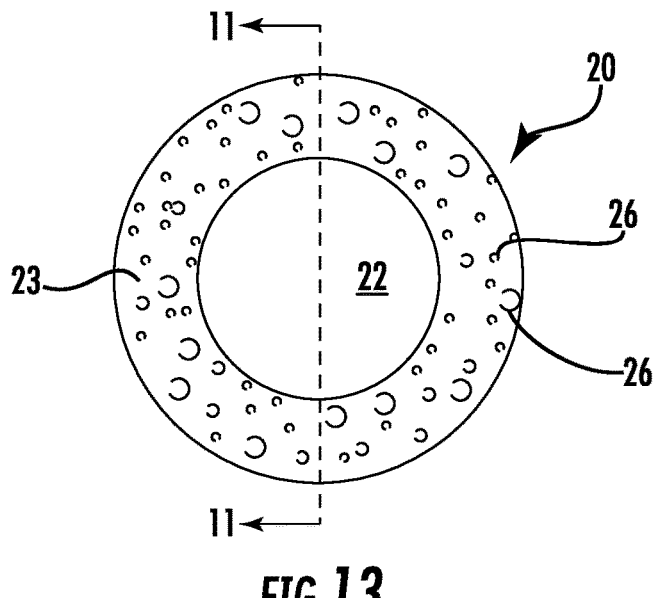
FIG. 13 is a cross sectional view of the braze product of FIG. 10.
Figure 14:
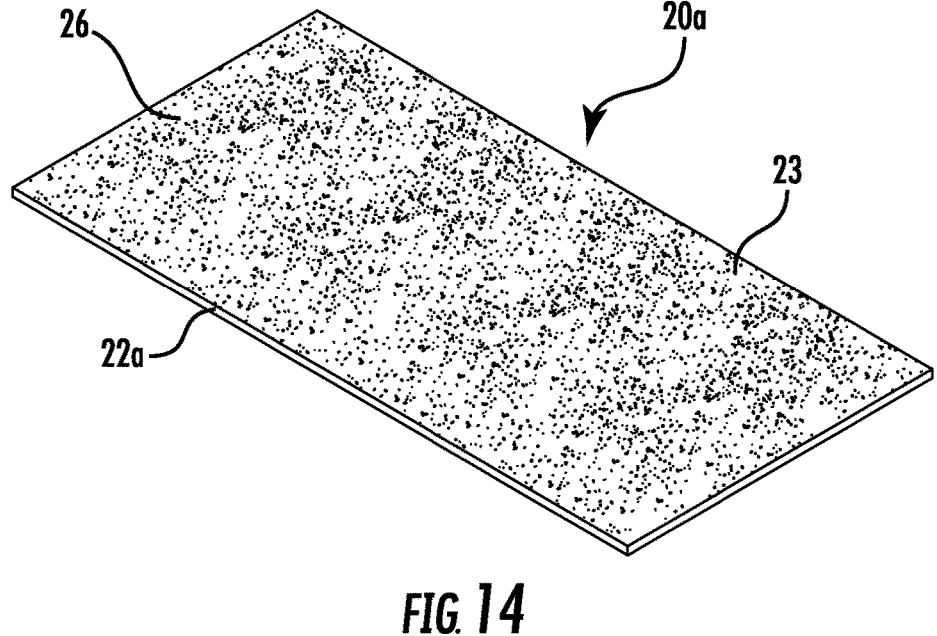
FIG. 14 is a perspective view of a braze product in the form of a sheet of braze alloy coated with flux containing additive particles applied to both major surfaces of the sheet according to aspects of the disclosure.
Figure 15:
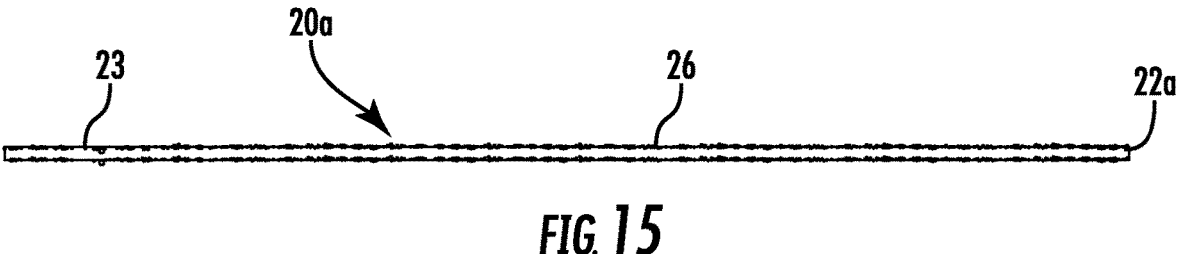
FIG. 15 is a sectional view through the sheet of braze alloy of FIG. 14.

FIGS. 11-13 illustrate a braze product 20 where the braze alloy is a wire or rod 22 coated with flux 23 and additive particles 26. FIGS. 14 and 15 illustrate a braze product 20*a* where the braze alloy takes the form of a sheet 22*a* coated with flux 23 and additive particles 26 on both sides. Rods of various cross-sectional shapes, braze preforms, and sheets of braze alloy may be coated with flux and additive particles by adding adhesive resin and non-VOC solvents to the flux, and applying the flux and additive particles to the outside surfaces of the rod, preform, or sheet. The flux, binder and particles can be applied using a process that produces a uniform coating that delivers a predetermined quantity of braze alloy, flux, and additive particles to a braze joint.

Alternatively, additive particles may be combined with a binder and used to coat the braze products of FIGS. 8-15 without flux. The flux may be added to the braze joint during brazing. A pre-determined weight percentage of additive particles may be delivered to a braze joint along with molten braze alloy using braze products coated with additive par- ticles. However, the additive particles are likely to arrive in the braze joint at a later time than when mixed with flux. Note that in this scenario, the flux will still protect the additive particles from oxidation, ensuring clean particles are delivered into the braze joint.

According to aspects of the disclosure, the flux and additive particles are combined as follows:

The flux composition is selected to be compatible with the base materials being joined and the braze material being used to form the braze joint.

The additive particles are selected by composition and size range according to criteria discussed in greater detail below.

The flux in powder form is combined with the additive particles and blended.

Water (or other liquid) is added to the blended flux powder and additive particles to form a thick paste.

The thick paste is blended to form a homogenous pasty mixture of flux and additive particles where the addi- tive particles are substantially evenly distributed in the mixture.

The pasty mixture of flux and additive particles is then dried and ground into a powder where the quantity of additive particles per unit weight of flux is pre-deter- mined and substantially constant. Where additive par- ticles of different size or material are used, each of the different additive particles are substantially evenly dis- tributed in the resulting powdered mixture.

This method of combining the flux and additive particles has several benefits. This method results in a substantially homogeneous mixture of flux and additive particles that can be used to produce a braze product with a pre-determined ratio of braze material, flux and additive particles by weight. The consistency of the flux paste can be controlled to prevent separation of large and small size additive particles or additive particles of different densities, so the resulting mixture is substantially homogeneous. The additive particles are coated by the flux, and so are cleaned by the flux as it melts and flows when the braze joint is heated. The dried mixture of flux and additive particles can be used to form the core of a braze product without requiring further processing such as heating that would be required if the pasty mixture were used without drying. Finally, the substantially homo- geneous powdered mixture of flux and additive particles can be delivered to a channel or core of a braze product using existing equipment configured to handle powdered flux, so no changes to existing manufacturing equipment is required.

According to aspects of the disclosure, the size, shape, and type of additive particles are selected to have a desired function and effect during formation of a braze joint and in the finished braze joint. In some embodiments of a braze product, the additive particles have a relatively large size range selected to bridge large gaps in a braze joint. Such a particulate additive is relatively large and can accumulate or stack in a gap to provide narrow paths for molten filter metal to be drawn into the joint by capillary action. Another application would be insoluble particles that would effec- tively act as scaffolding to control the joint thickness. The material from which the additive particles are formed is selected to ensure that the additive particles are wettable by or coalesce with the molten filler metal, so the additive particles become an integral part of the finished braze joint. In some embodiments, the particulate additive may be a metal having a melting point significantly higher than the melting point of the filler metal forming the sheath or body of the brazing wire or rod.

Several criteria are relevant to the selection of particles mixed with the flux. Metal additive particles may be selected to be soluble in the molten filler metal. Dissolution of a metal particle in the molten filler metal is dependent on a number of factors including but not limited to: the size of the particle, the temperature of the molten filler metal relative to the melting temperature of the particles, the length of time the metal particles are in contact with the molten filler metal, and the proportion of the metal particles relative to the volume of filler metal. In some circumstances, it is desirable for some fraction of the metal particles to dissolve into the braze alloy, which may produce an alloy or intermetallic phase with one or more metals in the braze alloy. The alloy formed in the braze joint may have improved or desirable properties relative to the filler metal such as a higher melt-point, increased tensile strength, greater ductility, or improved resistance to corrosion or wear. It may also be desirable for the metal additive particles not to dissolve in the molten braze alloy or to dissolve incompletely. When the metal additive particles do not dissolve or do not dissolve completely, the undissolved portion of the metal additive particles remain in the finished braze joint, facilitate dispersion strengthening and can provide improved properties such as resistance to wear and crack propagation.

Compatibility with the materials being joined is another factor relevant to the selection of additive particles. Interaction between the additive particles and the braze alloy takes place while the braze alloy is liquid, while interaction between the combined liquid braze alloy, additive particles, and base materials being joined take place while the base materials remain in a solid state. Diffusion of elements from the braze alloy into the surface of the base materials being joined is the primary mechanism by which the braze alloy is strongly bonded to the surface of the base material. Solid solubility is strongly associated with the potential for atomic diffusion. Solid solubility describes the extent to which one metal is capable of forming solid solutions with another metal. Some metals possess complete solid solubility with other metals, while others are practically insoluble in each other. Complete solid solubility is present in the binary systems Cr—Fe, Cr—V, Cu—Ni, and Cu—Pd. Iron and copper are common industrial metals and are found in many alloys such as steel and composite materials such as carbides where copper alloy is used to bind hard particles of carbide to form cutting edges. Pure elements that possess solid solubility with Fe-based and Cu-based alloys include Mn, Cr, V, Ti, Sc, Co, Ni, Zn, Ga, Ge, Pd, Ag, In, Sn, and Sb. Metal additive particles soluble in the molten braze alloy have the potential to form strong bonds between the braze alloy and the materials being joined due to the concentration gradients between the filler metal and base materials afforded by dissolution of the particles.

In the context of the disclosed braze products, diffusion occurs in the liquid and solid states. Diffusion in liquids is driven by concentration and density fluctuations. Interdiffusion coefficients are related to collective transport of mass driven by differences in chemical potential, i.e., concentration gradients. Fluid movement including convection contribute to mixing and dissolution of materials in the braze joint. Temperature and concentration gradients lead to density gradients and buoyancy driven convection. In solids, diffusion is driven primarily by concentration gradients. Diffusion requires compatibility of materials and energy, which can be imparted by direct heating or friction from movement. Dissolution and diffusion are time dependent. Under the correct conditions, additive particles will dissolve in the molten braze alloy and form intermetallic compounds with the molten braze alloy and some elements in the intermetallic compounds diffuse into the base material. It will be noted that diffusion works in both directions, with atoms of the base material diffusing into the braze alloy, with the same conditions impacting the rate and extent of diffusion in both directions. However, because diffusion occurs primarily from high to low concentration gradients, the diffusion in one direction will dominate the material couple. The extent to which intermetallic compounds are present and the extent of diffusion between the braze alloy and base materials is dependent upon the materials, particle size, heat (and other energy present in the joint during brazing) and time. In practice, it is preferable that the materials being joined are at the highest braze temperature for the shortest possible time to limit damage to the base materials. However, diffusion is favored by higher temperatures, longer times, and increased kinetic energy. Given this, any factors that can increase the rate of dissolution of the additive particles and the rate of diffusion between the braze alloy and the base materials are desirable.

One example of a braze alloy is an alloy of silver (Ag), copper (Cu), zinc (Zn), manganese (Mn) and nickel (Ni), in the proportions 49% Ag, 27.5% Cu, 20.5% Zn, 2.5% Mn and 0.5% Ni of the filler metal by weight. This filler metal has a melting temperature of approximately 690° C. (1274° F.). The addition of manganese improves wetting of difficult to wet materials such as tungsten carbide. One example of a metal additive particle is nickel particles having a size between 1 and 200 μm. Those skilled in the art will appreciate that it is technically impossible to produce particles having only one size, so particles are typically characterized in terms of size distributions, having upper and lower limits and an average particle size within the distribution. One useful size range for nickel particles is between 1 μm and 45 μm with an average particle size of between 4 μm and 16 μm. Another effective additive particle are nickel particles having an average diameter between 13 and 17 microns, with a maximum diameter of 45 microns. Pure nickel, and pure elements in general, has a high surface energy and will tend to form intermediate compounds with compatible metals in the molten braze alloy. Each particle of nickel has a surface area exposed to molten braze alloy and will dissolve or partially dissolve into the braze alloy at the outside surface. As the nickel particle dissolves, movement of the molten braze alloy brings new surface area of the particle into contact with the molten braze alloy. Increased turbulence in the molten braze alloy will tend to increase the rate at which additive particles dissolve into the molten braze alloy. Nickel is soluble in the braze alloy described above and has some solid solubility with Fe based steel and Cu based materials used as binders in matrix components such as carbides. Nickel has a melting temperature of approximately 1455° C. (2651° F.), will coalesce with the molten silver-based filler metal and will dissolve into the silver-based filler metal at a braze temperature between 1300° F. (704° C.) and 1400° F. (760° C.) given sufficient time. Nickel particles have a relatively high surface energy and when added to the braze joint in pure form will diffuse into Fe-based and Cu-based materials being joined. Smaller nickel particles between 1 and 10 microns can be expected to dissolve more quickly than larger nickel particles due to their increased surface area. Larger nickel particles between 20 and 40 microns will dissolve more slowly and can be used in situations where it is desirable that the metal additive particles not dissolve completely during a brazing operation.

The disclosed additive particles are not limited to nickel particles of one size range. It is possible to include metal additive particles of more than one size range when complete dissolution of some particles is desired to alter the properties of the filler metal, while ensuring that the finished braze joint includes undissolved metal additive particles. Additive particles of more than one type can be used according to aspects of the disclosure. The "types" of additive particles can differ by composition, size, and/or shape. Additive particles can be of a different size of the same material, different material of the same or different size, or different shape, size, and material. Additive particles of two or more types can be employed according to aspects of the disclosure. The same basic principles for selecting additive metal particles can be used in copper, nickel, gold, aluminum, and other braze alloy systems and are not limited to a silver based braze alloy system.

Alternatively, the metal additive particles may be particles of the base metals being joined by the filler metal. The base metal typically has a melting temperature greater than the melting point of the filler metal and particles of the base metal will be wettable by the filler metal and so will be integrated into the finished braze joint. A further alternative metal additive particle may be particles of a different braze filler metal alloy selected to be wettable and/or soluble in the molten filler metal of the body of the brazing wire or rod. Brazing alloys are available in a wide range of alloy compositions, melting temperatures and properties and a braze alloy can be selected to be compatible with a given filler metal and braze joint. In an alternative embodiment, the additive particles may include particles of more than one material. One example is additive particles including nickel particles of a small size range between 1 micron and 10 microns and larger additive particles of an AWS BNi braze alloy in a range of between 20 microns and 40 microns.

Coated, or composite particles may also be added to the flux according to aspects of the disclosure. Composite particles may include more than one metal that will diffuse into the braze alloy by dissolution, or a particle with an outer layer that dissolves, but an inner layer that remains intact and acts as a strengthener, which may be referred to as dispersion strengthening. Examples of complete dissolution couples would be a pure element and an alloy of the pure element such as pure nickel coated by a nickel alloy or a pure element coating another pure element such as cobalt or copper coating a nickel particle. An example of a non-dissolved strengthening particle is steel or stainless steel coated with copper, nickel or other compatible metal. Another example of a composite additive particle is tungsten carbide (WC) that may be coated with a metal or uncoated. WC particles will not dissolve into the filler metal, but can be wet by the molten filler metal and become incorporated into the finished braze joint and enhance properties of the finished braze joint such as abrasion resistance. In addition to metal particles added for increased strength via enhanced atomic diffusion and dispersion strengthening, elements may be selected to reduce grain size, modify the morphology of an interface layer adjacent the base material, modify the thickness and/or continuity of the interface layer.

In a disclosed braze products, including the additive particles in the flux can serve several purposes. First, the flux is designed to have a melting or activation temperature less than the melting temperature of the filler metal that forms the body of the braze wire or rod, so the flow of molten flux from the core of the braze wire or rod can distribute the additive particles into the braze joint where they will contact the molten filler metal and the base materials. In addition, the flux will remove oxidation and actively protect from the surface of the additive particles to ensure they are effectively wet by the filler metal and ultimately integrated into the finished braze joint. Including the additive particles in the flux core avoids the complexity of integrating the particles in the filter metal forming the body of the braze wire or rod. This ensures that the properties of the solid filler metal are not altered in a way that could adversely affect production of the braze wire or rod. Interaction between the additive particles, molten braze alloy and base materials is delayed until the act of brazing, providing some control over the time and conditions of these interactions. Finally, since the equipment and methods for filling the channel of a braze wire or rod with flux, and for coating braze alloy or preforms with flux are already in place, the addition of additive particles to the flux is a cost-effective way of adding desirable properties to a braze product.

The shape of the metal additive particles will depend on the methods used to produce them. Producing small metal particles from molten material tends to form generally spherical particles, while small metal particles produced from solid material will take the form of shavings. Particle shapes may include spheres, irregular spheres with surface protrusions, ellipsoids, regular polyhedrons, needles, rods, cylinders, tubes, prisms, flakes, shavings, etc. or any non-regular shape. The size with respect to particles referenced in this application refers to at least one dimension of the particle, e.g., the diameter, the radius, the surface area, etc. or in some cases the average of the particle's dimensions. In the context of this application, the particle size refers to the diameter of the particles. The size of particles included in the flux can be controlled using screens having mesh sizes as is known in the art. For example, a first screen can be used to remove particles greater than a desired diameter and a second screen can be used to remove particles having less than a desired diameter, with the remaining particles having diameters within a desired range.

The size and/or shape of additive particles added to a flux of a braze product may be significant in several aspects. First, the smaller the particle the larger its surface area relative to the volume of additive. With respect to metal additive particles that are soluble in the molten filler metal, increased surface area can be expected to increase the rate at which the metal additive particles dissolve during a braze cycle. With regard to dissolution of metal additive particles, the size can be selected to ensure a desired result, either that the metal additive particles dissolve completely or that the metal additive particles not dissolve completely during a given braze cycle. For metal particles that have a higher melt temperature than the braze alloy and are soluble in molten braze alloy, the primary mode of interaction with the molten filler metal will be dissolution. The size of additive particles also relates to how the additive particles behave when being added to the flux, how the additive particles move with the flux as the flux melts during a braze cycle, and how the additive particles move within a braze joint. Larger particles will only penetrate a braze joint to the extent the braze joint is large enough to receive them. This aspect of larger particles may be beneficial in that the larger particles may be expected to accumulate in the largest gaps of a braze joint and at the outside of the faying surfaces, such as the fillet or meniscus. Accumulation of additive particles in the largest gaps of a braze joint can bridge the large gap and enhance capillary movement of molten filler metal into the braze joint. Additive particles accumulated at the outer portions of a braze joint can serve to add desirable properties to the finished braze joint, such as enhanced hardness and resistance to abrasion.

In some embodiments it may be desirable to include additive particles of different size and different composition. For example, an additive particle of nickel might be selected to be the additive particle of small size, with an average diameter of between 1 μm and 10 μm. These small particles may be included to penetrate the braze joint, dissolve into the filler metal and alter the properties of the finished braze joint as described above. A second additive particle might be particles of a braze alloy selected to have a melting point significantly higher than the filler metal from which the body of the braze wire or rod is constructed. The particles can be selected to be wettable by the molten filler metal and/or soluble in the molten filler metal but included in a larger particle size to control positioning of the larger particles in the braze joint and allow for undissolved portions of the particles to remain in the finished braze joint.

The proportion of metal or composite particles added to the flux core of a flux cored wire or rod relative to the flux and filler metal is selected to produce desired movement of the particles during brazing and desired properties in the finished braze joint. The useful proportion of additive particles is believed to be between 0.5% and 30% by weight of the filler metal, with proportions of between 1.5% and 4.1% being proven experimentally effective.

Methods of forming a braze joint include application of vibration during a braze operation using the disclosed braze products. A combination of filler metal, flux and additive particles are introduced into a braze joint and vibration is applied while the filler metal is in a molten state. The vibration homogenizes the molten filler metal in the braze joint and assists flow of the molten filler metal within the braze joint. Vibration improves the braze joint by reducing porosity produced by gas bubbles within the braze joint and breaking up agglomerations of flux within the braze joint. Homogenization of the molten filler metal within the braze joint includes distribution of metal or metal alloy particles within the braze joint so that interaction between the molten filler metal and the metal or metal alloy particles within the braze joint is more uniform and predictable. Vibration applied to the molten braze alloy can be expected to increase the rate of energy dependent processes such as dissolution of metal particles or diffusion at the interface of the braze alloy and the materials being joined.

Vibration applied to a braze joint while the filler metal, flux and metal or metal alloy particles are present in the joint at a predetermined braze temperature can promote formation of improved braze joints in several ways. Vibration may assist in the chemical action of the flux to remove oxides from the base materials being joined and from the surface of metal or metal alloy additive particles. Removal and breaking up of oxides allows intimate contact and wetting of the surfaces of the materials being joined and the metal or metal alloy additive particles by the molten filler metal. Vibration homogenizes the materials within the braze joint. This may prevent or reduce separation of the braze alloy into low and high melt temperature constituents, increasing the uniformity and strength of the finished braze joint. Vibration may result in a more homogenous distribution of the metal or metal alloy particles within the molten filler metal within the braze joint, making the resulting braze joint more uniform and consistent. Vibration may accelerate melting or dissolution of the metal or metal alloy particles within the molten braze material so the resulting improvements in the finished braze joint are enhanced. Vibration adds energy to the braze joint and will tend to increase the rate at which diffusion occurs at the interface between the braze alloy and the base materials.

The duration and temperature of heat applied to materials being joined is an important factor in brazing. Generally, it is necessary to form a braze joint at a braze temperature that does not adversely affect the base materials being joined, so filler metals are formulated and selected to melt at predetermined temperatures. For example, when brazing aluminum base materials, the filler metal must be formulated to melt and flow below the melting temperature of the aluminum base materials. In the context of brazing semiconductors, the braze temperature must be below a temperature that will damage the semiconductors. In the downhole drilling industry, tungsten carbide cutters are provided with synthetic polycrystalline diamond cutting faces that are degraded by temperatures above about 1112° F. (600° C.). In most cases, the duration of high temperatures during formation of a braze joint can degrade the materials being joined even though the brazing temperature is below the melting or other critical temperature of the materials being joined. Ideally, the braze temperature is as low as possible and is maintained for a period that is as short as possible to form a strong braze joint. Application of vibration can be used to reduce the duration of peak braze temperatures in a braze process by accelerating mechanical and chemical processes within the braze joint at a predetermined braze temperature.

In the context of brazing dissimilar materials, wetting of the surfaces to be joined with the molten filler metal may be assisted by mechanical movement of the material to be joined when the filler metal is in a molten state. Diamond-faced tungsten carbide body cutters used in down hole drill bits are one example of a material that is difficult to wet with molten filler metal and it is common practice for a braze technician to rotate the cylindrical cutter in its semi-cylindrical pocket during brazing to physically smear the molten filler metal on the surface of the cutter to improve wetting of the cutter surface with molten filler metal. Manipulating a cutter when the braze joint is in a hot state is difficult and variation in this step is likely to produce variation in the properties of the resulting braze joint. According to aspects of the disclosure, vibration applied to the hot braze joint, in which the filler metal is in the liquid state, produces relative movement of the materials being joined and the molten flux within the braze joint that can facilitate a more uniform wetting of a carbide cutter without requiring physical manipulation of the cutter in a hot braze joint. Vibration can be applied in a predetermined direction for a predetermined period of time and at a predetermined pressure when the braze joint is at a predetermined braze temperature to produce a uniform wetting in less time and with greater uniformity/consistency than is possible in the prior art method that requires physical manipulation of one base material relative to another as in the drill bit cutter example.

In one disclosed embodiment of a braze joint, the materials to be joined are a steel drill bit head and a polycrystalline diamond-faced tungsten carbide cutter. The filler metal is silver based, with other metals and has a melting (liquidus) point of approximately 1274° F. (690° C.). The filler metal may take the form of a hollow or channeled body that surrounds or contains a powdered flux having a flow/activation temperature selected to be below the melting point of the filler metal. According to aspects of the disclosure pure nickel powder having a diameter of between 3 microns and 7 microns is mixed with the powdered flux. According to aspects of the disclosure, the powdered flux and metal powder mixture is prepared in a pasty state, blended, dried and ground to produce a homogenous mixture of powdered flux and metal powder. The mixture of metal powder and flux powder is deposited inside a tube, wrap, or channel formed in the metal alloy. According to aspects of the disclosure, in one embodiment, the nickel powder is present in a ratio of approximately 2% nickel powder to 98% filler metal. This is a metal-to-metal ratio, meaning irrespective of the flux powder that is the carrier. In this braze material, the pure nickel powder has a melting point of approximately 1455° C., significantly higher than the melting point of the silver-based filler metal of about 690° C. According to aspects of the disclosure, a disclosed braze method comprises:

Pre heating the braze assembly of the materials to be joined to a temperature of approximately 1100° F. (593° C.);

Heating the materials to be joined to a predetermined braze temperature of approximately 1350° F. (732° C.);

Adding braze product with powdered flux containing metal powder to an interface (joint) between the materials to be joined while the braze assembly is maintained at the braze temperature, the flux reaches a melting/flow point before the filler metal and flows out of the core or channel of the braze product into the joint, carrying the metal powder into the joint, the flux acts chemically to remove surface oxides from the surfaces of the materials to be joined within the joint and from the metal particles, the filler metal reaches its melting temperature and is drawn into the joint by capillary action, displacing the flux and combining with the metal particles in the joint;

Applying vibration for a period of 3-5 seconds to the materials to be joined while the flux, molten filler metal and metal powder are present in the joint, where the vibration homogenizes the mixture of molten filler metal and metal powder, aids flow of the molten filler metal and metal powder throughout the joint, aids removal of gas bubbles from the joint, and aids flow of flux out of the joint (removal of flux inclusions);

Removing vibration from the materials to be joined while the braze joint is at a predetermined braze temperature; and Allowing the assembly to cool.

According to aspects of the disclosure, vibration is applied to the less massive of the parts being joined. In the drill bit/cutter example, vibration is applied to the cutter. Vibration is conducted efficiently through the base materials to be joined and the molten filler metal. Vibration is coupled into the braze assembly (materials to be joined, molten filler metal, and additive particles) by contact with a vibration producing tool. Coupling contact may be described as "light" and is applied with little contact pressure. The object is to induce vibration in the braze assembly for the effects discussed above. The vibration tool has a vibration producing device, which may be an electric motor with an eccentrically positioned mass, which when rotated generates cyclic movement at a frequency corresponding to the rotational speed of the eccentric mass. Alternative vibration producing devices may include piezo-electric devices. The cyclic movement can be transmitted from the vibration producing device to a probe or rigid extension that can be brought into contact with the braze assembly. Contact between the probe and the less massive of the parts being joined when the braze assembly is at the predetermined braze temperature will result in cyclic movement of the parts to be joined and waves transmitted through the molten braze material. Effects of the vibration-induced cyclic movement of the solid parts to be joined in combination with waves in the molten (liquid) braze material may include:

Enhanced wetting of the surfaces to be joined by inducing cyclic movement of the parts to be joined and the molten flux and filler metal relative to the surfaces— this cyclic movement eliminates the need for a braze technician to physically move the cutter in the pocket as in the current practice;

Homogenization the molten braze mixture by mixing the constituent ingredients (elemental metals) in the molten filler metal so that the properties of the finished braze joint are more uniform and separation of elemental metals within the braze joint is less likely during cooling;

Mixing the metal or metal alloy particles more uniformly within the molten filler metal so that whatever effect the metal or metal alloy particles have on the finished braze joint, those effects are more uniform throughout the finished braze joint;

Accelerating the rate at which the metal or metal alloy particles dissolve into and alloy with the surrounding molten filler metal, which can maximize the effect of alloying the metal or metal alloy particles with the filler metal;

Adding energy to the braze joint to accelerate the rate at which diffusion occurs at the interface between the base materials and the braze alloy;

Accelerating the removal of oxide films from the surfaces to be joined by active compounds in the flux;

Inducing flow of molten filler metal, flux, and metal or metal alloy particles within the braze joint, producing more uniform filling of the joint; and Aiding in movement of gas bubbles and flux inclusions out of the braze joint, or reducing the size of gas bubbles or flux inclusions that remain in the braze joint, resulting in a more uniform filling of the braze joint and reduction in the occurrence of flaws and weak points in the finished braze joint.

Figure 16:
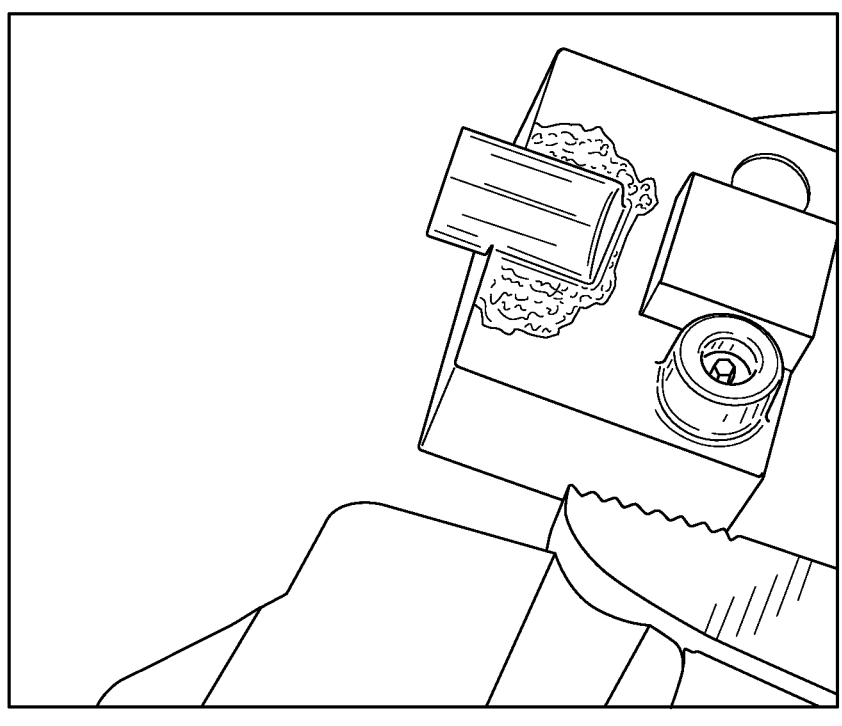
FIG. 16 is a photograph of a braze assembly including a steel block defining a semicylindrical pocket and a tungsten carbide cylinder received in the pocket and brazed by a method according to aspects of the disclosure.
Figure 17:
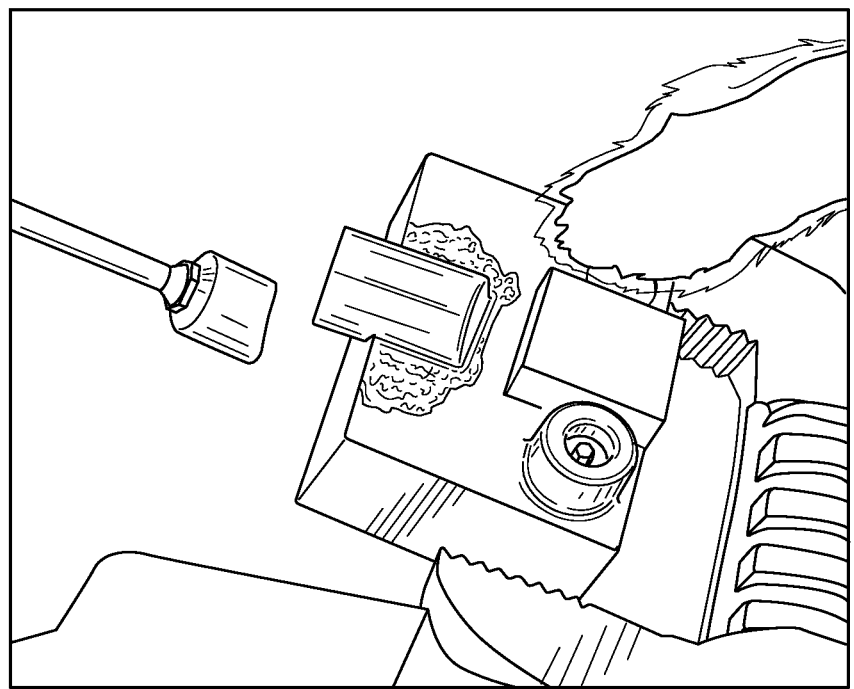
FIG. 17 is a photograph of the braze assembly of FIG. 16 being heated with a torch to a braze temperature.
Figure 18:
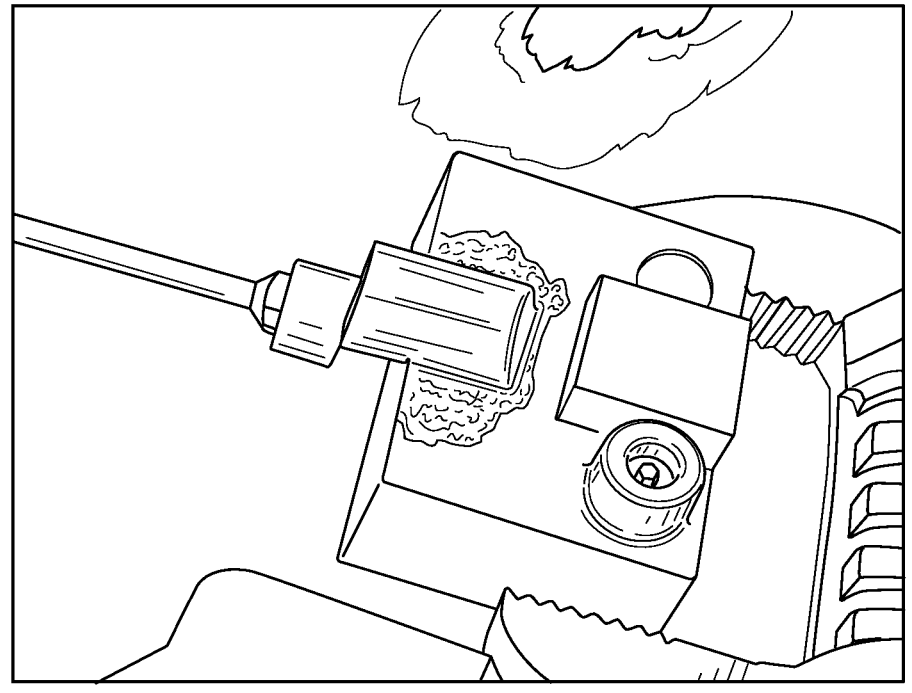
FIG. 18 is a photograph of the braze assembly of FIGS. 16 and 17 with vibration applied to the tungsten carbide cylinder when the braze assembly is at a brazing temperature according to aspects of the disclosure.
Figure 19:
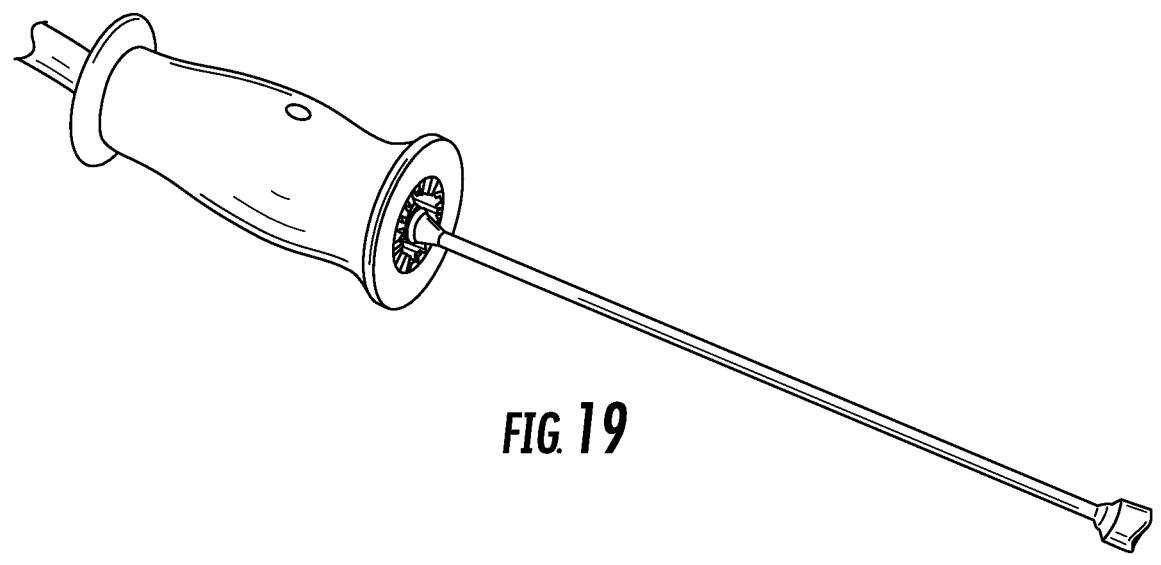
FIG. 19 illustrates a vibratory tool with an extended probe for coupling vibration into a braze assembly according to aspects of the disclosure.

In an embodiment of the disclosed brazing method, the vibrating tool generates low amplitude vibrations of about 540 Hz. Other vibration frequencies may include frequencies between 100 Hz and 1000 Hz. Vibration frequencies above 1000 Hz and up to and including ultrasonic vibration frequencies may be beneficial depending upon the materials to be joined, braze temperature, filler metal, flux composition and/or metal or metal alloy particles used. As shown in FIGS. 17-19, a metal probe connected to extend from the vibrating tool has a head that is brought into contact with one of the parts to be joined. As illustrated in FIGS. 16-18, in the exemplary embodiment where the parts to be joined are a down hole drill bit and diamond-faced tungsten carbide cutter, the probe may be brought into contact with the outer (diamond) face of the cutter for 2-6 seconds while the braze assembly is at brazing temperature and the braze joint has been filled with filler metal, flux and metal or metal alloy particles. In FIGS. 16-18, a block of steel selected to have similar properties to the steel from which a down hole drill bit is constructed and a cylinder of tungsten carbide are used to simulate one example of a braze joint where the disclosed methods and materials may be beneficial. The probe has a length and is constructed of a material that allow the probe and vibration tool to withstand the high temperatures and flame surrounding the braze assembly. The force of contact between the probe and the cutter can be described as light manual pressure on the order of 1-6 oz (30-70 g). The pressure is applied in a direction urging the cutter toward the rear surface of the pocket. In this example, the cutter has a cylindrical side surface and flat ends, with the outer end of a cutter used in an actual down hole drill bit including the polycrystalline diamond face. The pocket on the drill bit can be described as semi-cylindrical with a planar rear end face adjacent the flat rear end of the cutter and an open outer end that allows the diamond end face of the cutter to project from the drill bit. In this example, pressure from the probe is applied to the diamond face of the cutter to urge the cutter rearwardly into the pocket. An objective of contact between the vibrating probe and the cutter is to induce vibration in the cutter relative to the pocket in a direction urging the cutter toward the pocket. This application of vibration to the cutter should assist in seating the cutter in the pocket. This vibration-assisted seating of the cutter in the pocket may be contrasted with the current practice of rotating the cutter during brazing, which may inadvertently result in small misalignments of the cutter relative to the pocket.

Figure 20:
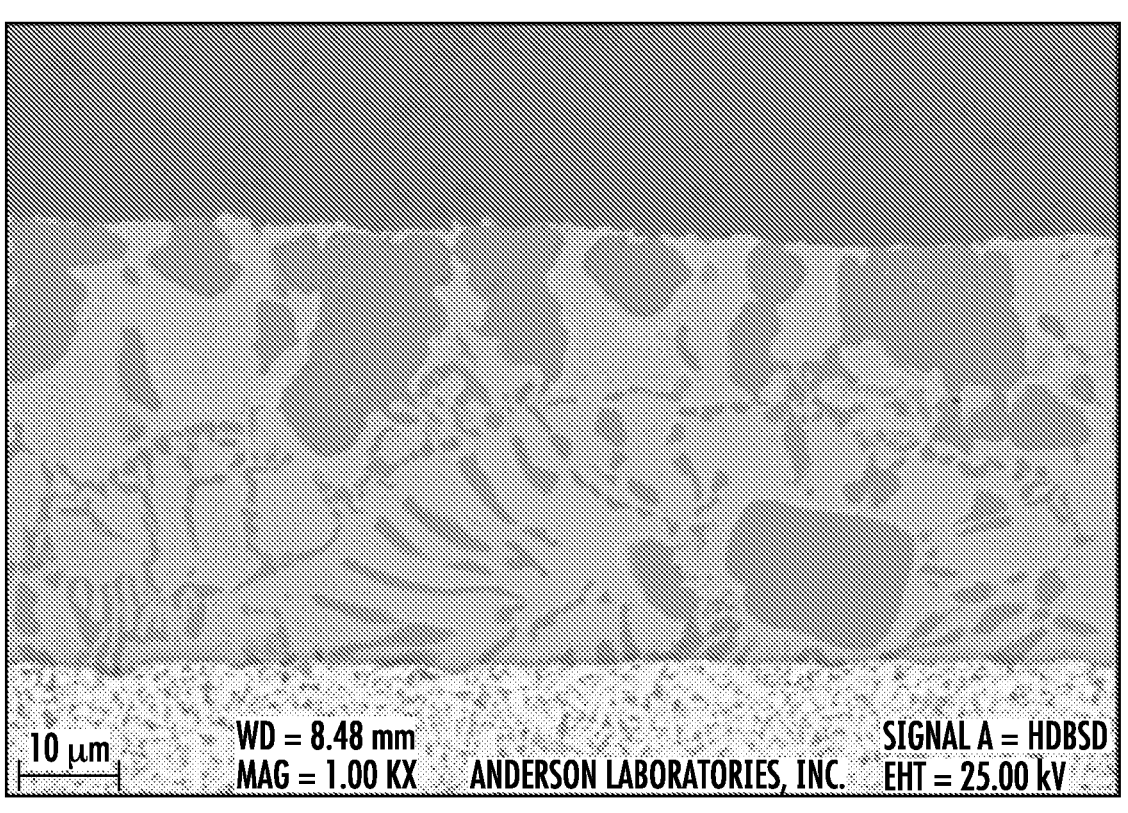
FIG. 20 is a magnified cross-sectional image of a braze joint formed between steel and tungsten carbide materials using a braze product not incorporating additive particles.

FIG. 20 is an enlarged image of a cross-section of a braze joint between a steel block defining a semicylindrical pocket and a cylindrical piece of tungsten carbide using a braze product including a braze alloy configured as shown in FIGS. 1-3 wrapped around a powdered flux core, where the powdered flux does not include additive particles according to the disclosure. The braze alloy is an alloy of silver (Ag), copper (Cu), zinc (Zn), manganese (Mn) and nickel (Ni), in the proportions 49% Ag, 27.5% Cu, 20.5% Zn, 2.5% Mn and 0.5% Ni of the filler metal by weight. This filler metal has a melting temperature of approximately 690° C. (1274° F.). The flux includes 25-35% boric acid, 12-30% potassium fluoroborate, 25-40% potassium bifluoride and 7-18% potassium tetraborate. The flux represents between 8-40% of the weight of the braze product, and in the tested embodiment, the flux is approximately 15% of the weight of the braze product. The parts to be brazed were pre-heated to a temperature of approximately 1100° F. (593° C.). The parts were then heated to a braze temperature of approximately 1350° F. (732° C.) and the braze product is used to introduce flux and braze alloy into the joint. After the joint is filled with flux and braze alloy, vibration at a frequency of between 250 Hz and 1000 Hz is applied to the cylindrical piece of tungsten carbide for a period of 3-5 seconds using a light manual pressure. The assembly is then cooled. The braze joint is cut, polished and an enlarged image is taken using a scanning electron microscope (SEM) to show the microstructure of the braze alloy and materials being joined.

Figure 21:
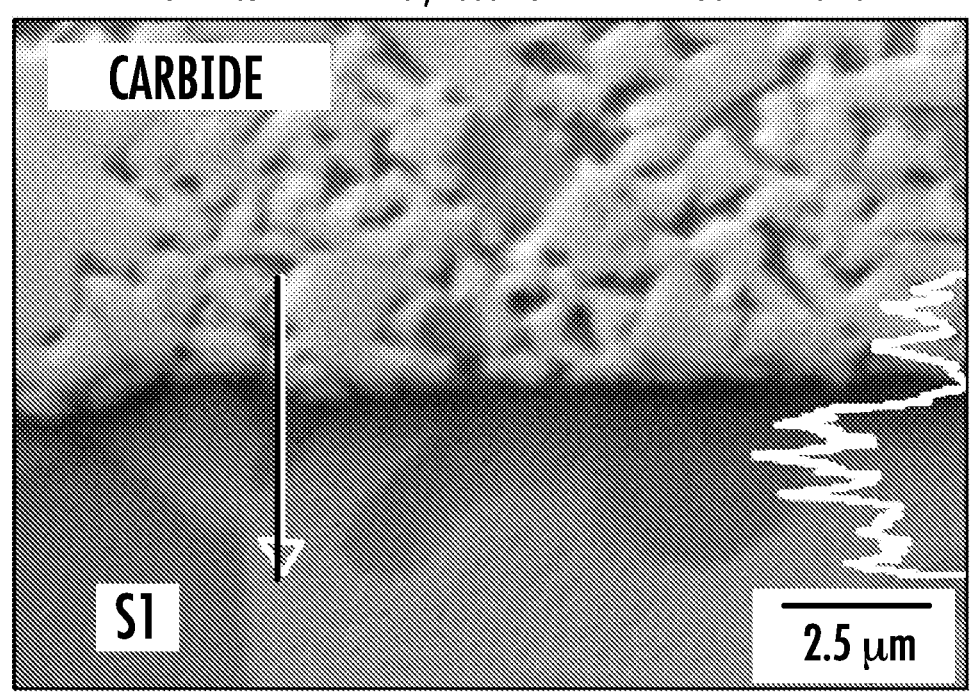
FIG. 21 is a magnified cross-sectional image of an inter-face layer between tungsten carbide and the braze alloy of FIG. 20 showing a scan line (vertical line) along which the chemical composition along the line from the carbide into the filler metal) was determined using an energy dispersive spectrometer (EDS)
Figure 22:
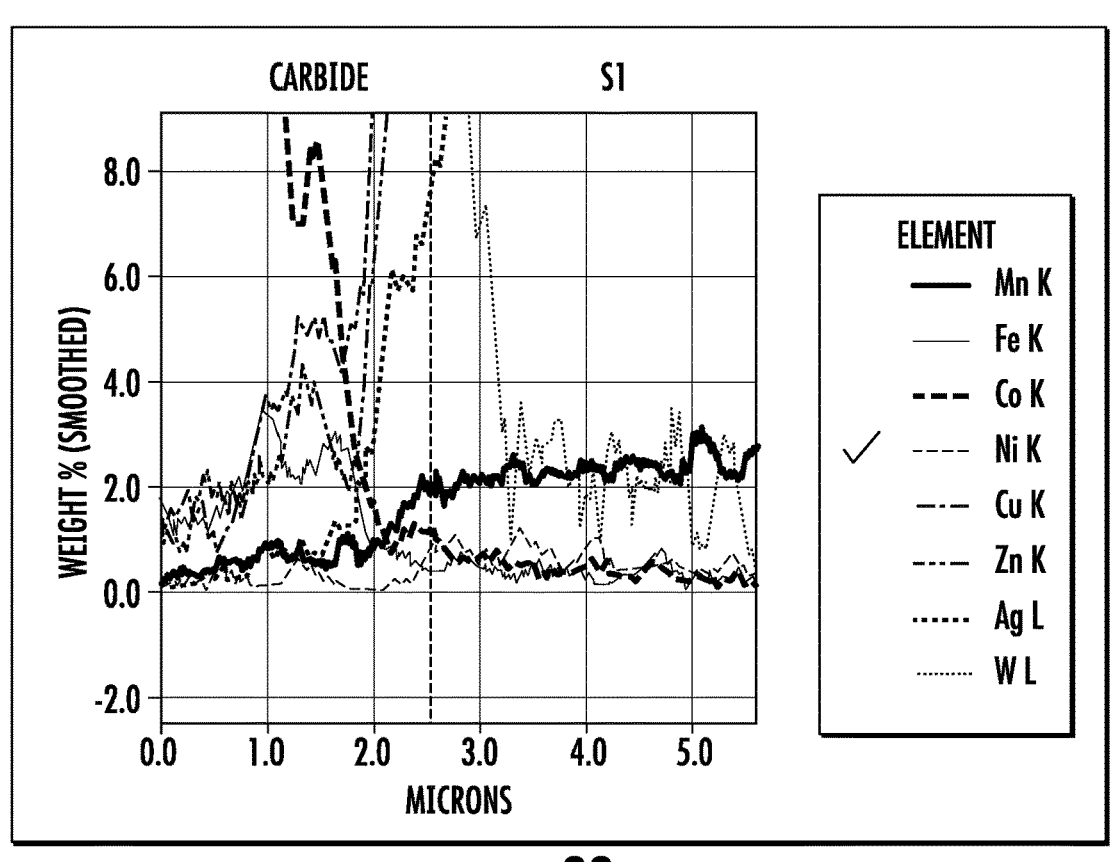
FIG. 22 is a graphical presentation of elements detected in the interface layer along the scan line of FIG. 21.
Figure 23:
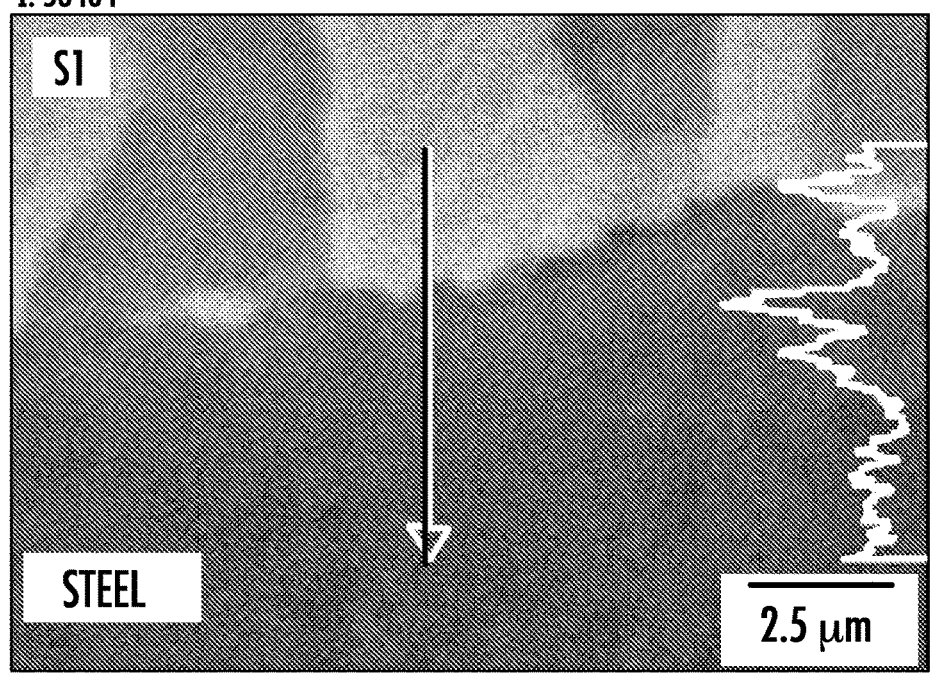
FIG. 23 is a magnified cross-sectional image of an inter-face layer between steel and the braze alloy of FIG. 20 showing a scan line (vertical line) along which the chemical composition along the line from the carbide into the filler metal) was determined using an energy dispersive spectrom-eter (EDS)
Figure 24:
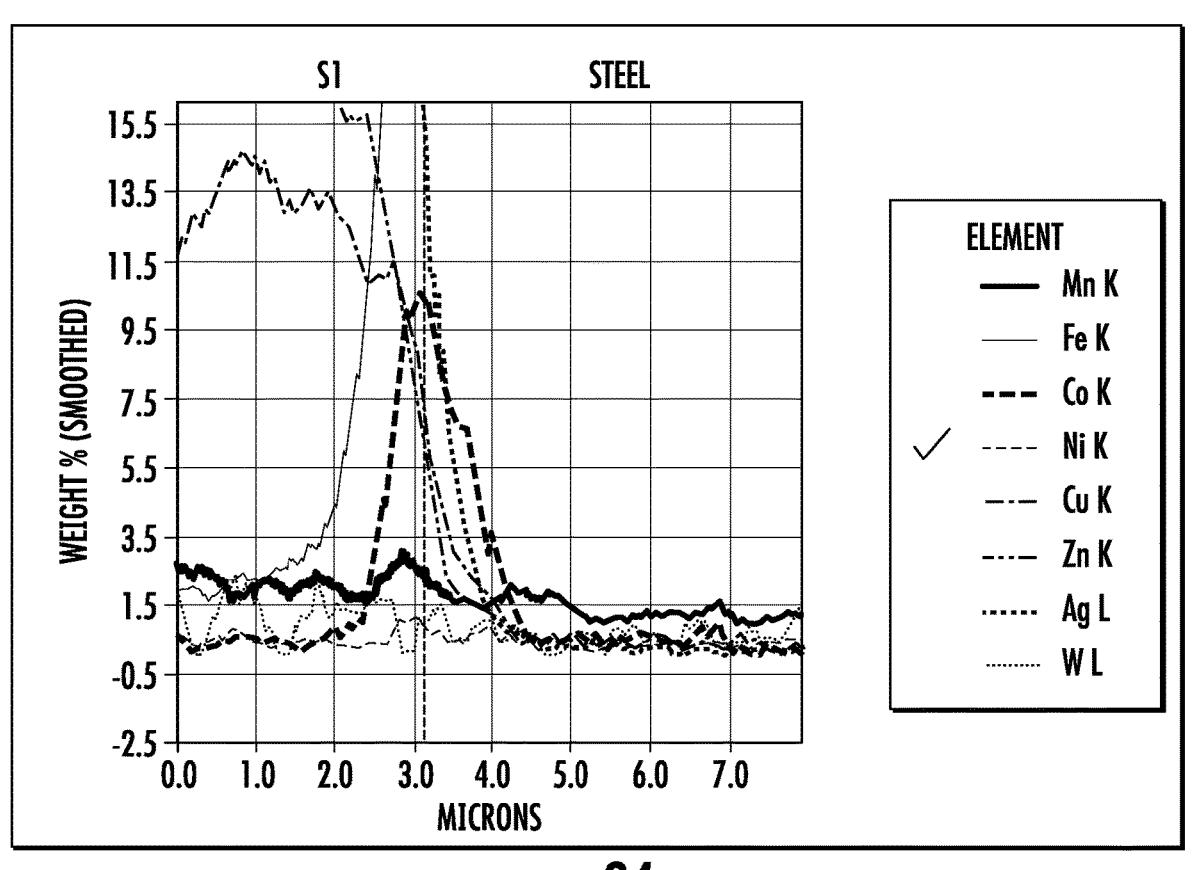
FIG. 24 is a graphical presentation of elements detected in the interface layer along the scan line of FIG. 22.

In the image of FIG. 20, steel is at the top of the image and tungsten carbide is at the bottom with solidified braze alloy in the middle. The dark areas are primarily a Cu—Zn phase with a relatively small amount of nickel. The lighter contrast phase is primarily Ag with lesser amounts of Cu and Zn. No continuous boundary layer is present at the interface of the braze alloy with either the steel or tungsten carbide materials. FIG. 21 is a representative region of the interface between the tungsten carbide and braze alloy shown at higher magnification, with the tungsten carbide shown at the top of the image. A vertical scan line extending from the tungsten carbide into the braze alloy shows the region of the tungsten carbide/braze alloy interface analyzed using energy dispersive spectroscopy (EDS). The results of the EDS scan along the scan line shown in FIG. 21 are graphically presented in FIG. 22. The EDS scan shows relatively little Ni present at the interface and diffusion of Ni into the carbide of less than 0.5 μm. FIG. 23 is a representative region of the interface between the steel and the braze alloy shown at higher magnification, with steel shown at the bottom of the image. A vertical scan line extending from the braze alloy into the steel shows the region of the steel/braze alloy interface analyzed using EDS. The results of the EDS scan along the scan line of FIG. 23 are graphically presented in FIG. 24. The EDS scan shows relatively little Ni present at the interface and diffusion of Ni into the steel of less than 1 μm.

Figure 25:
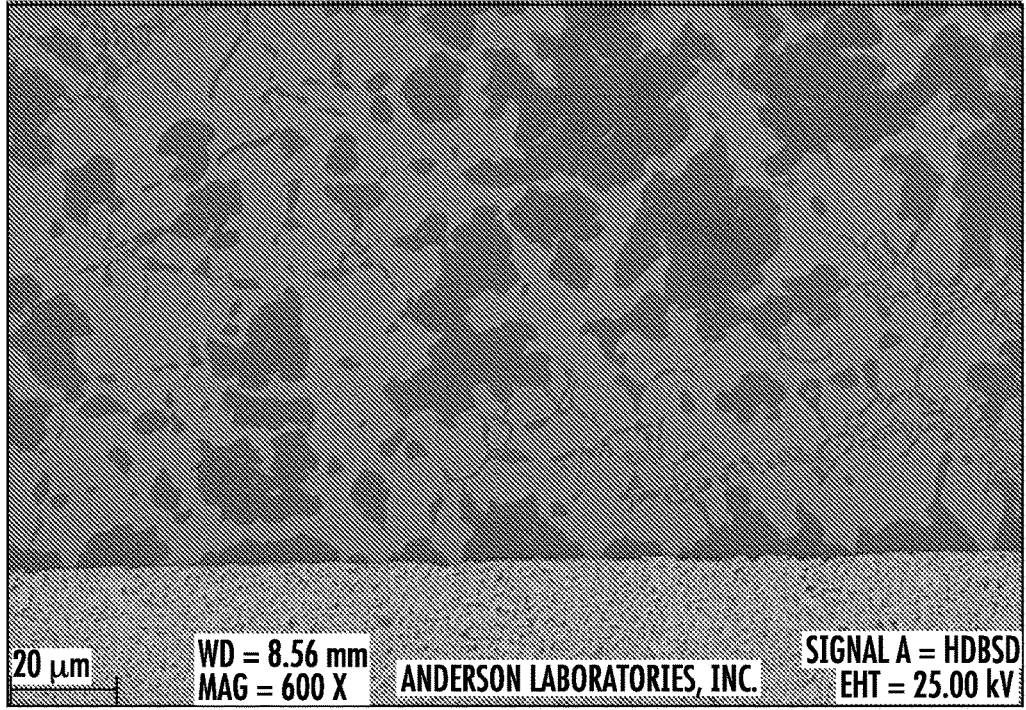
FIG. 25 is a magnified cross-sectional image of a braze joint formed by a braze product with flux incorporating additive particles, showing an interface of the braze alloy with tungsten carbide.
Figure 26:
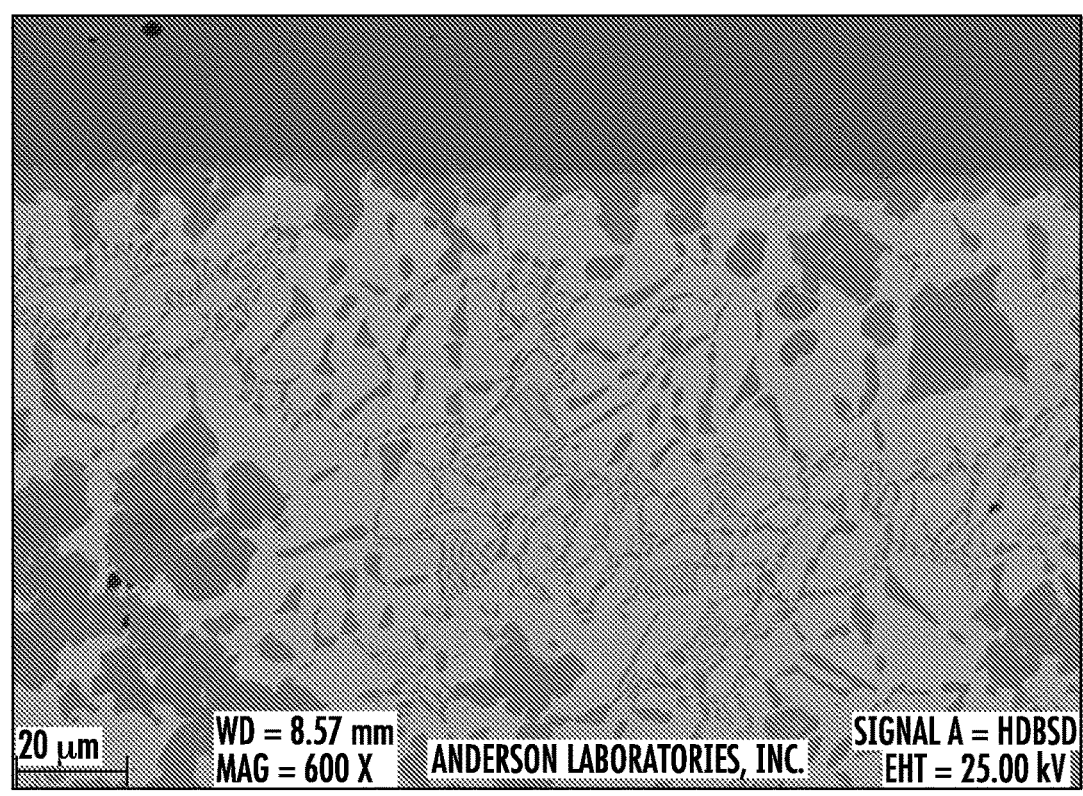
FIG. 26 is a magnified cross-sectional image of a braze joint formed by a braze product with flux incorporating additive particles, showing an interface of the braze alloy with steel.

FIGS. 25 and 26 are SEM images of a braze joint between steel and tungsten carbide prepared using a braze product according to the disclosure. The only difference between the braze parameters and materials used to prepare the braze joint illustrated and analyzed in FIGS. 25-30 and the braze joint illustrated and analyzed in FIGS. 20-24 is the addition of nickel powder to the flux core of the braze product according to aspects of the disclosure. Ni powder having an average size of 3-7 μm is added to the flux in an amount equal to between 4 and 6% of the weight of the combined flux and nickel powder. FIG. 25 shows a substantial accumulation of Cu—Zn enriched with Ni at the tungsten carbide surface, while FIG. 26 shows a substantially continuous layer of Ni-rich Cu—Zn phase at the steel surface. An increased amount of eutectic structure is present in the solidified braze alloy compared with the braze joint shown in FIG. 20, and the structure is finer and more homogeneous. The comparatively darker regions in the approximate center of the various Cu—Zn phase are enriched in Ni, which suggests nucleation and growth from one or more Ni particles.

Figure 27:
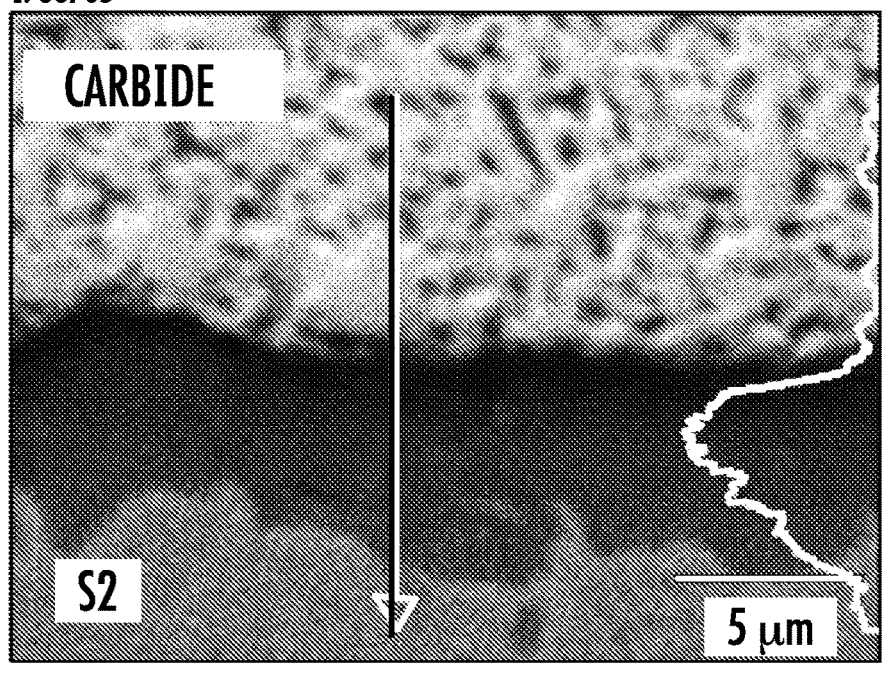
FIG. 27 is a magnified cross-sectional image of an inter-face layer between tungsten carbide and the braze alloy of FIG. 25 showing a scan line (vertical line) along which the chemical composition along the line from the carbide into the filler metal) was determined using an energy dispersive spectrometer (EDS)
Figure 28:
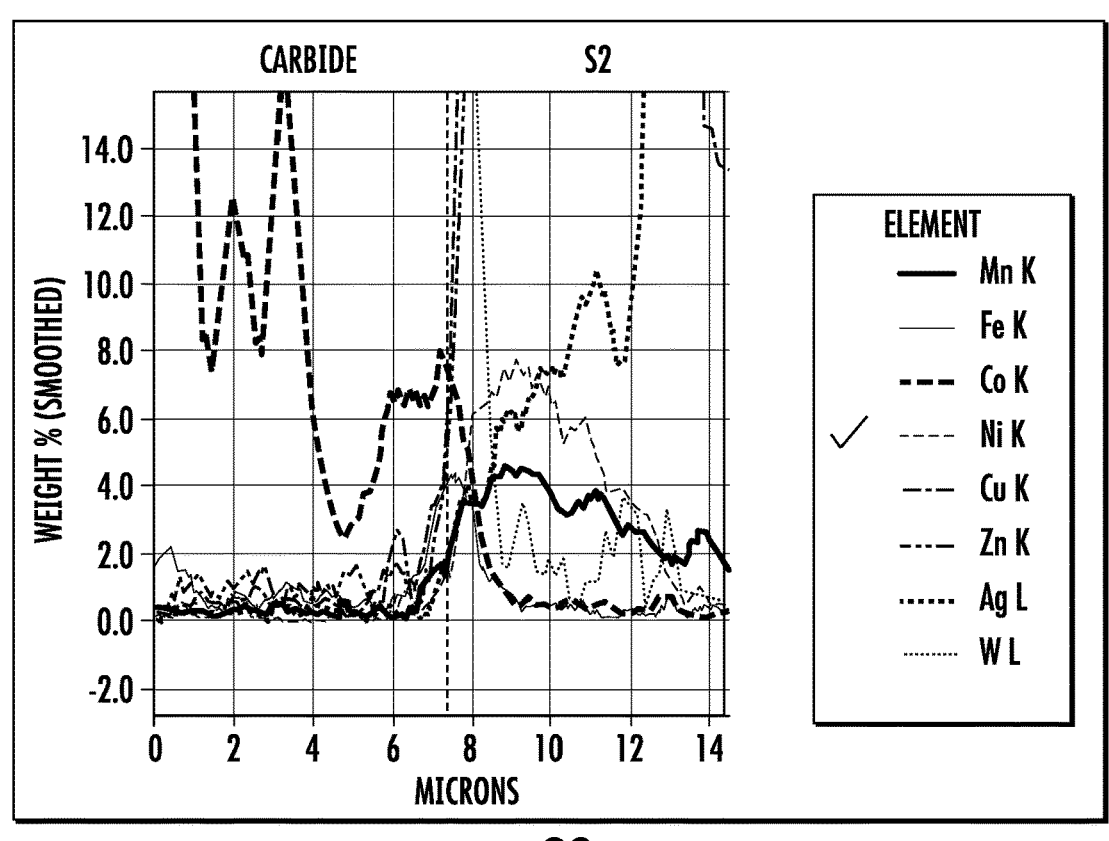
FIG. 28 is a graphical presentation of elements detected in the interface layer along the scan line of FIG. 27.
Figure 29:
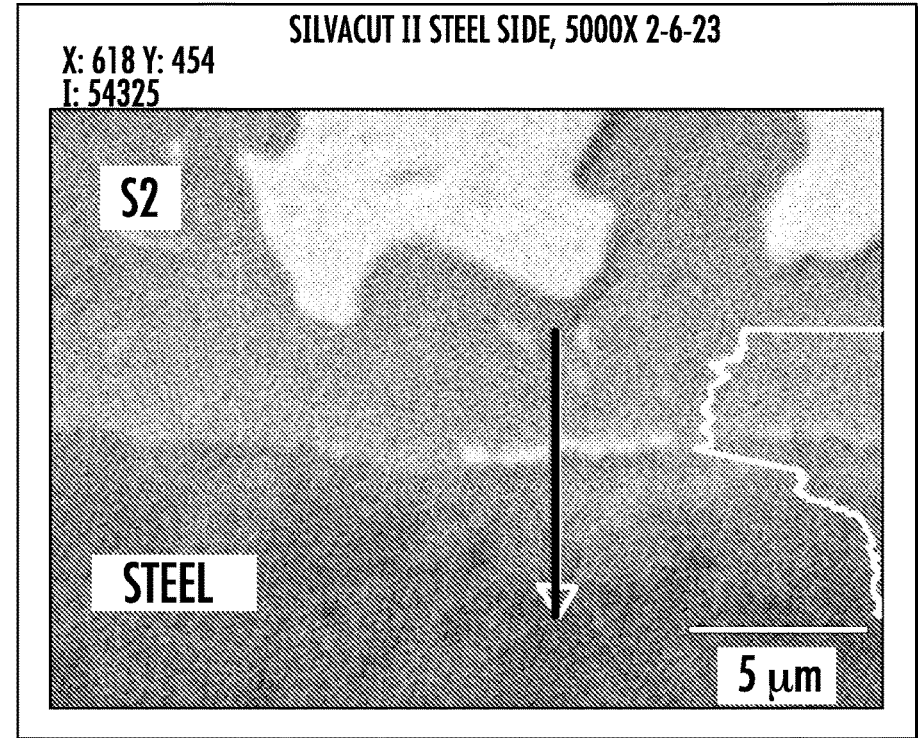
FIG. 29 is a magnified cross-sectional image of an inter-face layer between steel and the braze alloy of FIG. 25 showing a scan line (vertical line) along which the chemical composition along the line from the carbide into the filler metal) was determined using an energy dispersive spectrom-eter (EDS)
Figure 30:
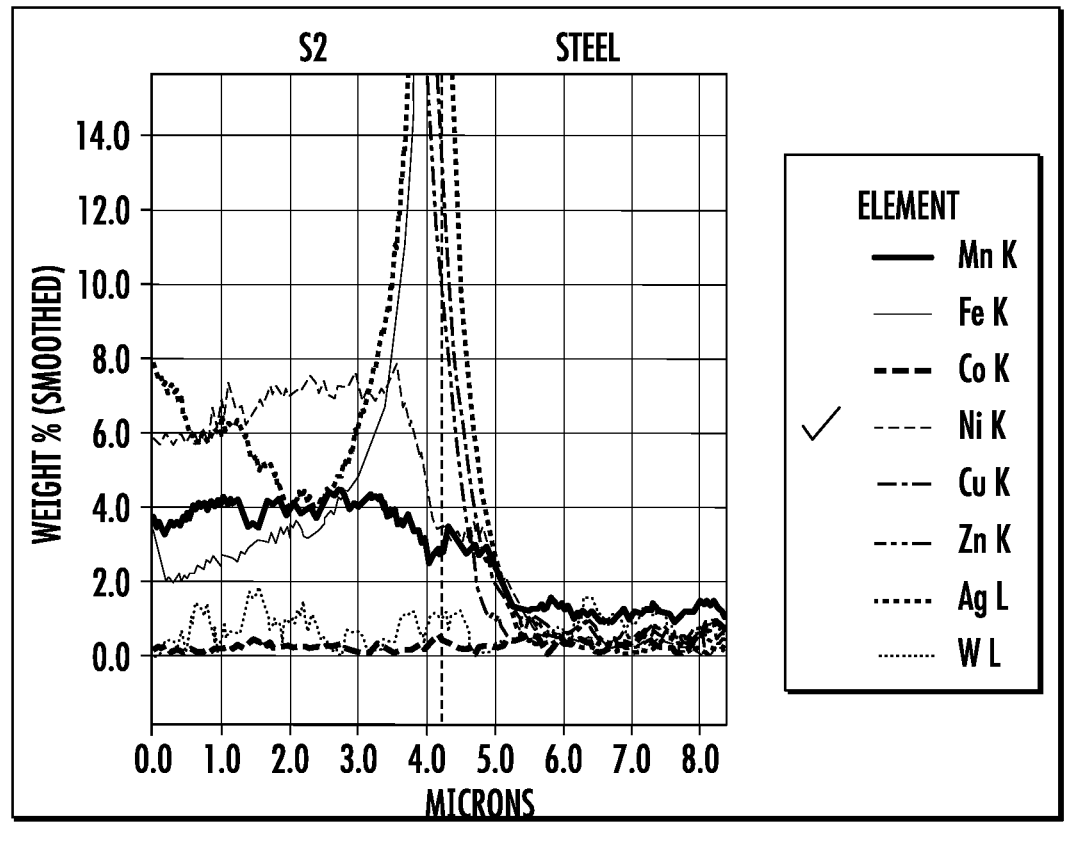
FIG. 30 is a graphical presentation of elements detected in the interface layer along the scan line of FIG. 29.

FIG. 27 is an SEM image of the interface between the tungsten carbide and braze alloy of FIG. 25, with the tungsten carbide shown at the top of the image. A vertical scan line extending from the tungsten carbide into the braze alloy shows the region of the tungsten carbide/braze alloy interface analyzed using energy dispersive spectroscopy (EDS). The results of the EDS scan along the scan line shown in FIG. 27 are graphically presented in FIG. 28. The EDS scan shows substantial Ni present at the interface and diffusion of Ni into the carbide of approximately 1 μm. FIG. 29 is a representative region of the interface between the steel and the braze alloy shown at higher magnification. A vertical scan line extending from the braze alloy into the steel shows the region of the braze alloy/steel interface analyzed using energy dispersive spectroscopy (EDS). The results of the EDS scan along the scan line shown in FIG. 29 are graphically presented in FIG. 30. The EDS scan shows substantial Ni present at the interface and diffusion of Ni into the steel of approximately 1.5 μm.

Figure 31:
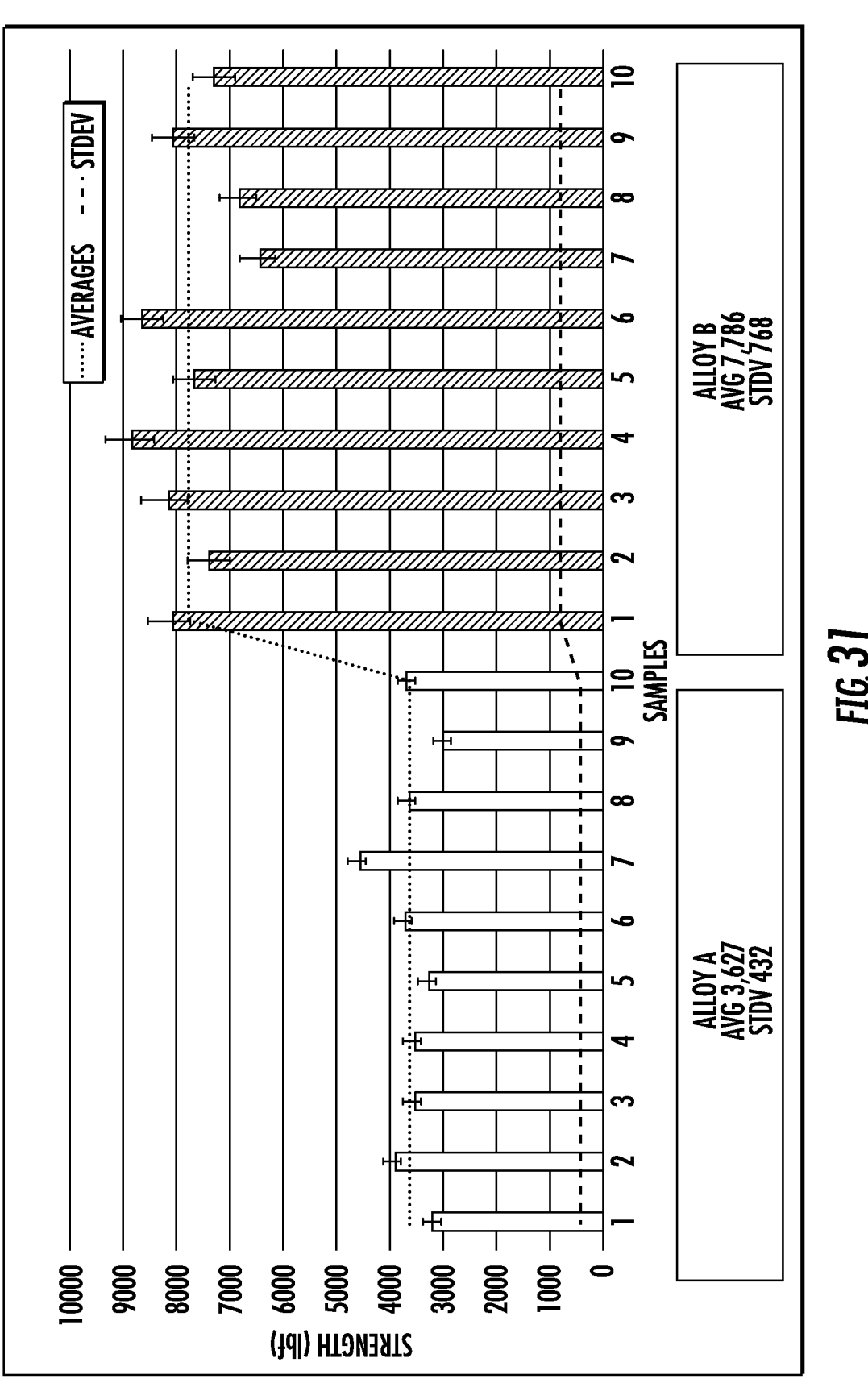
FIG. 31 is a graphical comparison of one measure of joint strength produced by a prior art braze product compared to an embodiment of a braze product according to aspects of the disclosure.

Experimental results demonstrate that the Ni powder added to the flux of the braze product is effectively delivered to the faying surfaces of a braze joint along with the flux. A substantial portion of the Ni powder remains in the braze joint and is concentrated at the faying surfaces of the joint even though the flux is no longer present. The Ni powder produces Ni-rich phases of braze alloy at the interface surfaces with both the steel and tungsten carbide. Diffusion of Ni into the steel and tungsten carbide is approximately doubled at both the steel and tungsten carbide surfaces in comparison to the filler metal without added Ni particles. Measurements of the force required to push the tungsten carbide cylinder from the semicylindrical pocket show that the strength of the bond between the tungsten carbide and the steel is approximately doubled as shown in FIG. 31.

What is claimed:

1. A wire, rod, sheet or preform for brazing, said wire, rod, sheet, or preform comprising:

a braze filler metal formed into a body of the wire, rod, sheet, or preform and having a channel, cavity, core, or coating, said braze filler metal having a first melting temperature;

brazing flux disposed in the channel, cavity, core, or coating, said brazing flux having a second melting temperature; and additive particles comprising metal particles evenly distributed in the brazing flux, said metal particles having a particle size between 1 and 200 microns, wherein the metal particles are present in a proportion of between .5% and 8% of the braze filler metal by weight, said metal particles released from the channel, cavity, core, or coating when the brazing flux is melted at the second melting temperature and said metal particles are soluble in the braze filler metal when the braze filler metal has melted at said first melting temperature, and at least some of said metal particles having a size greater than 20 microns remain partially undissolved after a brazing operation.

2. The wire, rod, sheet, or preform for brazing of claim 1, wherein the additive particles are metal particles having a third melting temperature greater than said first melting temperature.

3. The wire, rod, sheet, or preform for brazing of claim 1, wherein said additive particles are metal particles consisting of an elemental metal having a third melting temperature at least 100° C. greater than said first melting temperature.

4. The wire, rod, sheet, or preform for brazing of claim 2, wherein said metal particles have an average diameter between 13 and 17 microns, with a maximum diameter of 45 microns.

5. The wire, rod, sheet, or preform for brazing of claim 1, wherein the additive particles have a first size range and a second size range, the size of metal particles in the second size range being from 2 to 40 times the size of metal particles in the first size range.

6. The wire, rod, sheet, or preform for brazing of claim 5, wherein the first size range is between 1 micron and 10 microns and the second size range is between 20 microns and 40 microns.

7. The wire, rod, sheet, or preform for brazing of claim 1, wherein the body of the wire or rod is formed from an elongate strip of filler metal having longitudinal edges, the elongate strip formed to surround the brazing flux and additive particles, with the longitudinal edges of the elongate sheet adjacent each other.

8. The wire, rod, sheet, or preform for brazing of claim 2, wherein the metal particles are soluble in the filler metal when the filler metal has melted, the metal particles having a first size range between 1 and 10 microns dissolving into the molten filler metal at a first time after the wire, rod, sheet, or preform is heated to said first melting temperature, and the metal particles in a second size range between 20 and 40 microns dissolving into the molten filler metal at a second time after the wire, rod, sheet, or preform is heated to said first melting temperature, said second time being greater than said first time.

9. The wire, rod, sheet or preform for brazing of claim 4, wherein the metal particles are nickel particles and the braze filler metal comprises between 20% and 30% Cu by weight.

10. The wire, rod, sheet or preform for brazing of claim 4, wherein the braze filler metal comprises between 40% and 50% Ag, between 20% and 30% Cu and less than 5% Ni by weight and the metal particles are nickel particles.

11. The wire, rod, sheet or preform for brazing of claim 4, wherein the metal particles are nickel or nickel alloy particles and the combined total of nickel in the braze filler metal and metal additive particles does not exceed 10% of the braze filler metal by weight.

12. The wire, rod, sheet or preform for brazing of claim 1, wherein the metal additive particles have complete solid solubility in at least one metal present in the braze filler metal.

13. The wire, rod, sheet or preform for brazing of claim 12, wherein the metal additive particles are nickel or nickel alloy and the braze filler metal includes between 20% and 30% copper by weight.

14. The wire, rod, sheet or preform for brazing of claim 12, wherein the metal additive particles have solid solubility with iron.

* * * * *